(12) United States Patent
Webber et al.

(10) Patent No.: US 7,339,715 B2
(45) Date of Patent: Mar. 4, 2008

(54) PROCESSES FOR THE PRODUCTION OF ELECTROPHORETIC DISPLAYS

(75) Inventors: Richard M. Webber, Brookline, MA (US); Thomas H. Whitesides, Somerville, MA (US); Guy M. Danner, Somerville, MA (US); Craig A. Herb, Medford, MA (US); Charles H. Honeyman, Roslindale, MA (US); Michael McCreary, Acton, MA (US)

(73) Assignee: E Ink Corporation, Cambridge, MA (US)

( * ) Notice: Subject to any disclaimer, the term of this patent is extended or adjusted under 35 U.S.C. 154(b) by 806 days.

(21) Appl. No.: 10/807,594

(22) Filed: Mar. 24, 2004

(65) Prior Publication Data

US 2004/0226820 A1 Nov. 18, 2004

Related U.S. Application Data

(60) Provisional application No. 60/481,550, filed on Oct. 23, 2003, provisional application No. 60/320,050, filed on Mar. 25, 2003.

(51) Int. Cl.
*G02B 26/00* (2006.01)
(52) U.S. Cl. ............... 359/296; 427/469; 427/472; 427/473; 427/162; 427/212; 427/213; 427/213.31; 430/32; 430/35
(58) Field of Classification Search .......... 427/469, 427/472, 473, 162, 212, 213, 213.31; 430/32, 430/35; 359/296
See application file for complete search history.

(56) References Cited

U.S. PATENT DOCUMENTS 2,975,052 A * 3/1961 Fotland et al. ............ 430/48

(Continued)

FOREIGN PATENT DOCUMENTS

EP 1 145 072 B1 5/2003

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Evelyn A. Lester
(74) *Attorney, Agent, or Firm*—David J. Cole

(57) ABSTRACT

A coating of an encapsulated electrophoretic medium is formed on a substrate (106) by dispersing in a fluid (104) a plurality of electrophoretic capsules (102), contacting at least a portion of a substrate (106) with the fluid (104); and applying a potential difference between at least a part of the portion of the substrate (106) contacting the fluid (104) and a counter-electrode (110) in electrical contact with the fluid (104), thereby causing capsules (102) to be deposited upon at least part of the portion of the substrate (106) contacting the fluid (102). Patterned coatings of capsules containing different colors may be deposited in registration with electrodes using multiple capsule deposition steps. Alternatively, a patterned coating may be deposited upon a substrate containing a conductive layer by varying the conductivity of the conductive layer by radiation exposure or by coating portions of the conductive layer with an insulating layer, typically a photoresist.

30 Claims, 15 Drawing Sheets

U.S. PATENT DOCUMENTS

| | | | |
|---|---|---|---|
| 3,166,418 | A * | 1/1965 | Gundlach ............. 430/32 |
| 3,394,002 | A * | 7/1968 | Bickmore ............. 430/48 |
| 3,553,093 | A * | 1/1971 | Putnam et al. ......... 430/32 |
| 3,582,205 | A * | 6/1971 | Carreira ............... 430/32 |
| 3,668,106 | A | 6/1972 | Ota |
| 3,756,693 | A | 9/1973 | Ota |
| 3,767,392 | A | 10/1973 | Ota |
| 3,792,308 | A | 2/1974 | Ota |
| 3,870,517 | A | 3/1975 | Ota et al. |
| 3,892,568 | A | 7/1975 | Ota |
| 4,418,346 | A | 11/1983 | Batchelder |
| 5,151,741 | A * | 9/1992 | Kakutani et al. ....... 430/32 |
| 5,582,703 | A | 12/1996 | Sluzky et al. |
| 5,745,094 | A | 4/1998 | Gordon, II et al. |
| 5,760,761 | A | 6/1998 | Sheridon |
| 5,777,782 | A | 7/1998 | Sheridon |
| 5,808,783 | A | 9/1998 | Crowley |
| 5,872,552 | A | 2/1999 | Gordon, II et al. |
| 5,930,026 | A | 7/1999 | Jacobson et al. |
| 5,961,804 | A | 10/1999 | Jacobson et al. |
| 5,975,680 | A | 11/1999 | Wen et al. |
| 6,017,584 | A | 1/2000 | Albert et al. |
| 6,054,071 | A | 4/2000 | Mikkelsen, Jr. |
| 6,055,091 | A | 4/2000 | Sheridon et al. |
| 6,067,185 | A | 5/2000 | Albert et al. |
| 6,097,531 | A | 8/2000 | Sheridon |
| 6,118,426 | A | 9/2000 | Albert et al. |
| 6,120,588 | A | 9/2000 | Jacobson |
| 6,120,839 | A | 9/2000 | Comiskey et al. |
| 6,124,851 | A | 9/2000 | Jacobson |
| 6,128,124 | A | 10/2000 | Silverman |
| 6,130,773 | A | 10/2000 | Jacobson et al. |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,153,075 | A | 11/2000 | Nemelka |
| 6,172,798 | B1 | 1/2001 | Albert et al. |
| 6,177,921 | B1 | 1/2001 | Comiskey et al. |
| 6,184,856 | B1 | 2/2001 | Gordon, II et al. |
| 6,225,971 | B1 | 5/2001 | Gordon, II et al. |
| 6,232,950 | B1 | 5/2001 | Albert et al. |
| 6,241,921 | B1 | 6/2001 | Jacobson et al. |
| 6,249,271 | B1 | 6/2001 | Albert et al. |
| 6,252,564 | B1 | 6/2001 | Albert et al. |
| 6,262,706 | B1 | 7/2001 | Albert et al. |
| 6,262,833 | B1 | 7/2001 | Loxley et al. |
| 6,271,823 | B1 | 8/2001 | Gordon, II et al. |
| 6,300,932 | B1 | 10/2001 | Albert |
| 6,301,038 | B1 | 10/2001 | Fitzmaurice et al. |
| 6,312,304 | B1 | 11/2001 | Duthaler et al. |
| 6,312,971 | B1 | 11/2001 | Amundson et al. |
| 6,323,989 | B1 | 11/2001 | Jacobson et al. |
| 6,327,072 | B1 | 12/2001 | Comiskey et al. |
| 6,376,828 | B1 | 4/2002 | Comiskey |
| 6,377,387 | B1 | 4/2002 | Duthaler et al. |
| 6,392,785 | B1 | 5/2002 | Albert et al. |
| 6,392,786 | B1 | 5/2002 | Albert |
| 6,413,790 | B1 | 7/2002 | Duthaler et al. |
| 6,422,687 | B1 | 7/2002 | Jacobson |
| 6,445,374 | B2 | 9/2002 | Albert et al. |
| 6,445,489 | B1 | 9/2002 | Jacobson et al. |
| 6,459,418 | B1 | 10/2002 | Comiskey et al. |
| 6,473,072 | B1 | 10/2002 | Comiskey et al. |
| 6,480,182 | B2 | 11/2002 | Turner et al. |
| 6,487,002 | B1 | 11/2002 | Biegelsen |
| 6,498,114 | B1 | 12/2002 | Amundson et al. |
| 6,504,524 | B1 | 1/2003 | Gates et al. |
| 6,506,438 | B2 | 1/2003 | Duthaler et al. |
| 6,512,354 | B2 | 1/2003 | Jacobson et al. |
| 6,515,649 | B1 | 2/2003 | Albert et al. |
| 6,518,949 | B2 | 2/2003 | Drzaic |
| 6,521,489 | B2 | 2/2003 | Duthaler et al. |
| 6,531,997 | B1 | 3/2003 | Gates et al. |
| 6,535,197 | B1 | 3/2003 | Comiskey et al. |
| 6,538,801 | B2 | 3/2003 | Jacobson et al. |
| 6,545,291 | B1 | 4/2003 | Amundson et al. |
| 6,580,545 | B2 | 6/2003 | Morrison et al. |
| 6,639,578 | B1 | 10/2003 | Comiskey et al. |
| 6,652,075 | B2 | 11/2003 | Jacobson |
| 6,657,772 | B2 | 12/2003 | Loxley |
| 6,664,944 | B1 | 12/2003 | Albert et al. |
| D485,294 | S | 1/2004 | Albert |
| 6,672,921 | B1 | 1/2004 | Liang et al. |
| 6,680,725 | B1 | 1/2004 | Jacobson |
| 6,683,333 | B2 | 1/2004 | Kazlas et al. |
| 6,693,620 | B1 | 2/2004 | Herb et al. |
| 6,704,133 | B2 | 3/2004 | Gates et al. |
| 6,710,540 | B1 | 3/2004 | Albert et al. |
| 6,717,716 | B2 | 4/2004 | Kawai |
| 6,721,083 | B2 | 4/2004 | Jacobson et al. |
| 6,724,519 | B1 | 4/2004 | Comiskey et al. |
| 6,727,881 | B1 | 4/2004 | Albert et al. |
| 6,738,050 | B2 | 5/2004 | Comiskey et al. |
| 6,750,473 | B2 | 6/2004 | Amundson et al. |
| 6,753,999 | B2 | 6/2004 | Zehner et al. |
| 6,788,449 | B2 | 9/2004 | Liang et al. |
| 6,816,147 | B2 | 11/2004 | Albert |
| 6,819,471 | B2 | 11/2004 | Amundson et al. |
| 6,822,782 | B2 | 11/2004 | Honeyman et al. |
| 6,825,068 | B2 | 11/2004 | Denis et al. |
| 6,825,829 | B1 | 11/2004 | Albert et al. |
| 6,825,970 | B2 | 11/2004 | Goenaga et al. |
| 6,831,769 | B2 | 12/2004 | Holman et al. |
| 6,839,158 | B2 | 1/2005 | Albert et al. |
| 6,842,167 | B2 | 1/2005 | Albert et al. |
| 6,842,279 | B2 | 1/2005 | Amundson |
| 6,842,657 | B1 | 1/2005 | Drzaic et al. |
| 6,864,875 | B2 | 3/2005 | Drzaic et al. |
| 6,865,010 | B2 | 3/2005 | Duthaler et al. |
| 6,866,760 | B2 | 3/2005 | Paolini Jr. et al. |
| 6,870,657 | B1 | 3/2005 | Fitzmaurice et al. |
| 6,870,661 | B2 | 3/2005 | Pullen et al. |
| 7,072,095 | B2 * | 7/2006 | Liang et al. ............. 359/296 |
| 7,079,302 | B2 * | 7/2006 | Kawai ..................... 359/296 |
| 2002/0060321 | A1 | 5/2002 | Kazlas et al. |
| 2002/0063661 | A1 | 5/2002 | Comiskey et al. |
| 2002/0090980 | A1 | 7/2002 | Wilcox et al. |
| 2002/0113770 | A1 | 8/2002 | Jacobson et al. |
| 2002/0113871 | A1 | 8/2002 | Sakamaki et al. |
| 2002/0130832 | A1 | 9/2002 | Baucom et al. |
| 2002/0151246 | A1 | 10/2002 | Ikeda et al. |
| 2002/0180687 | A1 | 12/2002 | Webber |
| 2003/0011560 | A1 | 1/2003 | Albert et al. |
| 2003/0020844 | A1 | 1/2003 | Albert et al. |
| 2003/0102858 | A1 | 6/2003 | Jacobson et al. |
| 2003/0132908 | A1 | 7/2003 | Herb et al. |
| 2003/0137521 | A1 | 7/2003 | Zehner et al. |
| 2003/0151702 | A1 | 8/2003 | Morrison et al. |
| 2003/0214695 | A1 | 11/2003 | Abramson et al. |
| 2003/0222315 | A1 | 12/2003 | Amundson et al. |
| 2004/0012839 | A1 | 1/2004 | Cao et al. |
| 2004/0014265 | A1 | 1/2004 | Kazlas et al. |
| 2004/0027327 | A1 | 2/2004 | LeCain et al. |
| 2004/0075634 | A1 | 4/2004 | Gates |
| 2004/0094422 | A1 | 5/2004 | Pullen et al. |
| 2004/0105036 | A1 | 6/2004 | Danner et al. |
| 2004/0112750 | A1 | 6/2004 | Jacobson et al. |
| 2004/0119681 | A1 | 6/2004 | Albert et al. |
| 2004/0136048 | A1 | 7/2004 | Arango et al. |
| 2004/0155857 | A1 | 8/2004 | Duthaler et al. |
| 2004/0180476 | A1 | 9/2004 | Kazlas et al. |
| 2004/0196215 | A1 | 10/2004 | Duthaler et al. |
| 2004/0233509 | A1 | 11/2004 | Zhang et al. |

| | | | |
|---|---|---|---|
| 2004/0252360 | A1 | 12/2004 | Webber et al. |
| 2004/0257635 | A1 | 12/2004 | Paolini, Jr. et al. |
| 2005/0000813 | A1 | 1/2005 | Pullen et al. |
| 2005/0035941 | A1 | 2/2005 | Albert et al. |
| 2005/0099672 | A1 | 5/2005 | Jacobson et al. |
| 2005/0105159 | A1* | 5/2005 | Paolini et al. ............... 359/296 |

FOREIGN PATENT DOCUMENTS

| | | |
|---|---|---|
| JP | 2000-322002 | 11/2000 |
| JP | 2001-264824 | 9/2001 |
| JP | 2001-265262 | 9/2001 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 03/107315 | 12/2003 |

OTHER PUBLICATIONS

Bach, U., et al., "Nanomaterials-Based Electrochromics for Paper-Quality Displays", Adv. Mater, 14(11), 845 (2002).

Bocarsley, A.B.; Tachikawa, H.; and Faulkner, L.R. in "Laboratory techniques in electroanalytical chemistry," 2nd edition, eds. Kissinger, P.T. and Heineman, W.R., 855898, Marcel Dekker, New York: 1996.

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliablity Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Hayward, R.C.; Saville, D.A.; Aksay, I.A. "Electrophoretic assembly of colloidal crystals with optically tunable micropatterns," Nature, 404, 56-59, (2000).

Henzen, A. et al., "Development of Active Matrix Electronic Ink Displays for Handheld Devices", SID 03 Digest, 176, (2003).

Jacobson, J., et al., "The last book", IBM Systems J., 36, 457 (1997).

Jo. G-R, et al., "Toner Display Based on Particle Movements", Chem. Mater, 14, 664 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

Morrison, S. R., "Electrochemistry at semiconductor and oxidized metal electrodes," Plenum Press, New York: 1980.

Napper, D.H., "Polymeric Stabilization of Colloidal Dispersions", Academic Press: London, 1983.

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

van den Meerakker, J.E.A.M.; Meulenkap, E.A.; and Scholten, M., "Photochemical characterization of tin doped indium oxide," J. Applied Phys., 74, 3282-3288, (1993).

Webber, R., "Image Stability in Active-Matrix Microencapsulated Electrophoretic Displays", SID 02 Digest, 126 (2002).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

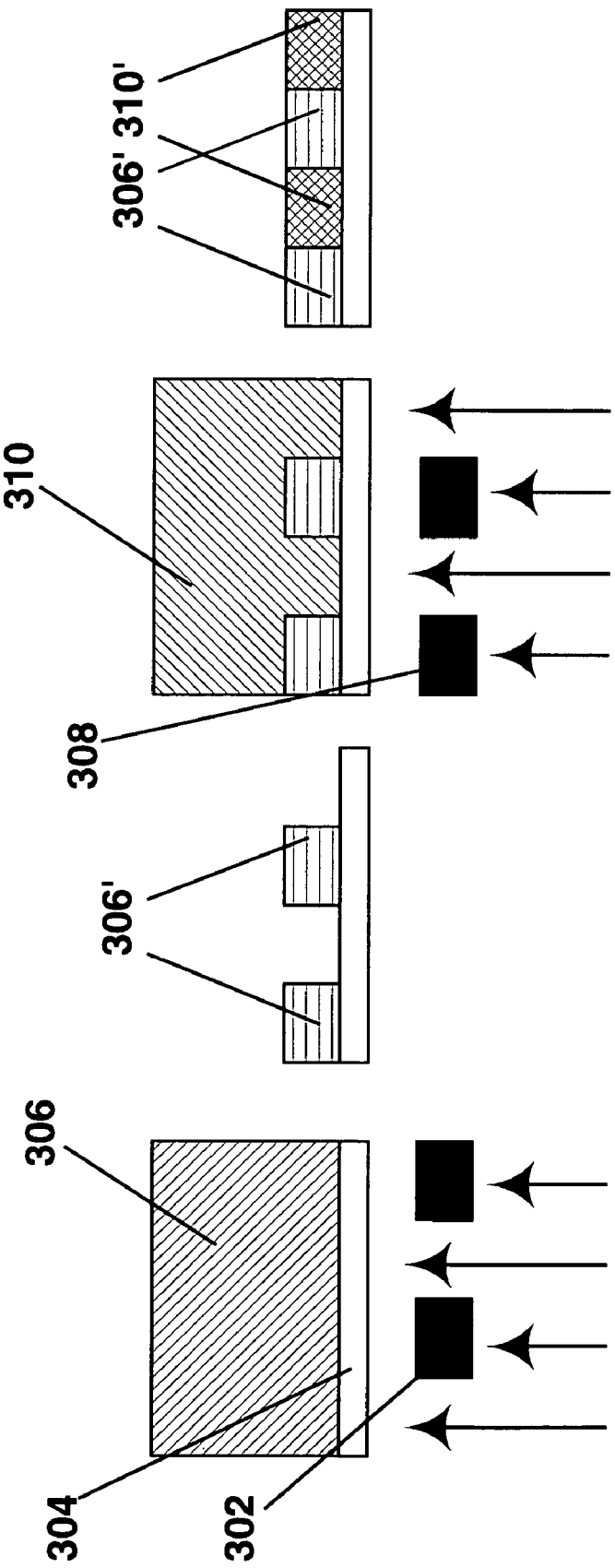

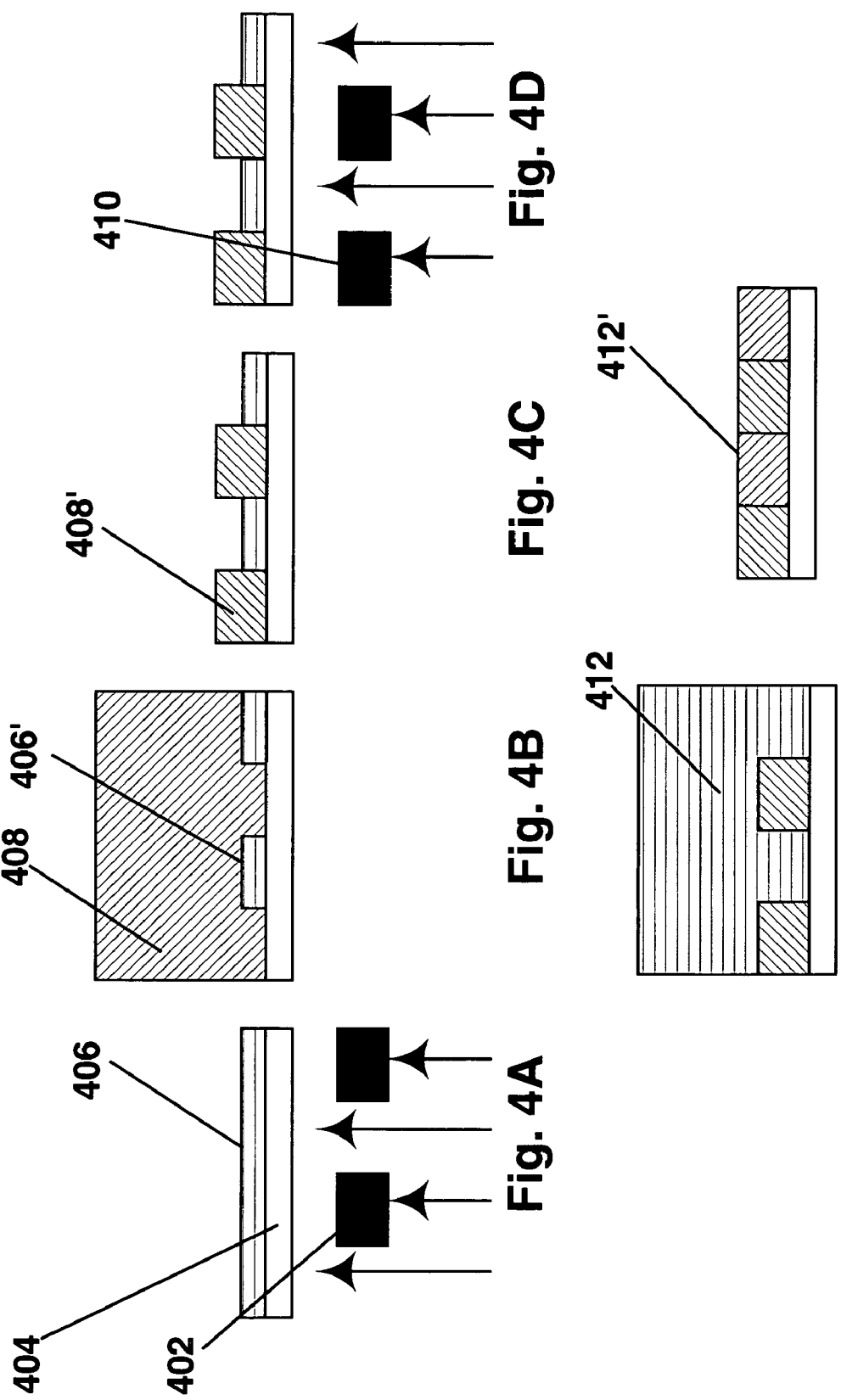

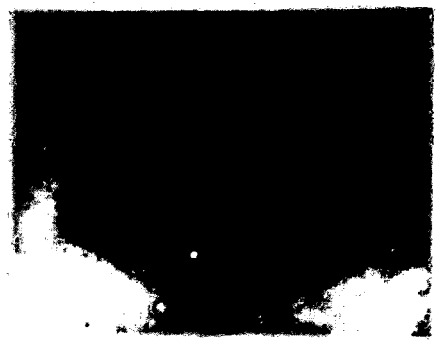
Fig. 16
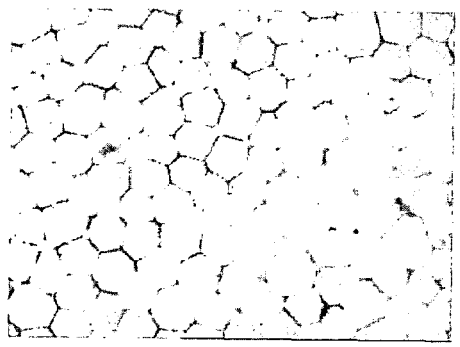
Fig. 19A
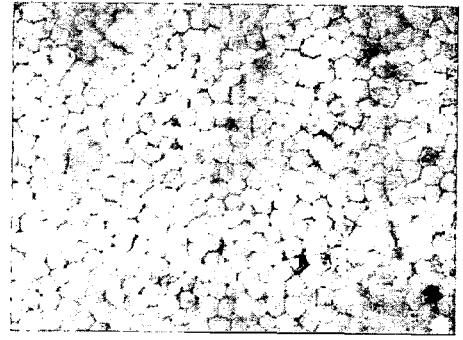
Fig. 19B
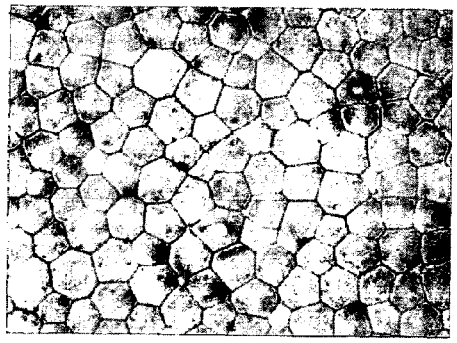
Fig. 19C
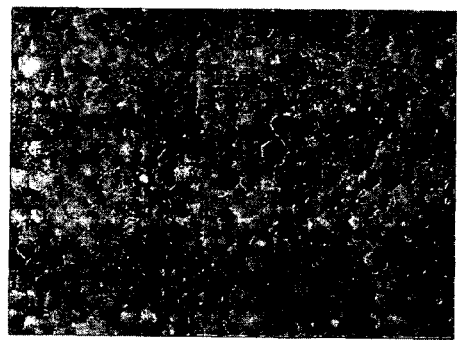
Fig. 19D

PROCESSES FOR THE PRODUCTION OF ELECTROPHORETIC DISPLAYS

REFERENCE TO RELATED APPLICATIONS

This application claims benefit of Provisional Application Ser. No. 60/320,050, filed Mar. 25, 2003, and of Provisional Application Ser. No. 60/481,550, filed Oct. 23, 2003.

This application is also related to copending application Ser. No. 09/349,806, filed Jul. 8, 1999, Publication No. 2002/0113770.

The entire contents of these copending applications, and of all other U.S. patents and published and copending applications mentioned below, are herein incorporated by reference.

BACKGROUND OF INVENTION

This invention relates to processes for the production of electrophoretic displays.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Electrophoretic displays have been the subject of intense research and development for a number of years. Such displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.) Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,721; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; and 6,704,133; and U.S. Patent Applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0171910; 2002/0180687; 2002/0180688; 2002/0185378; 2003/0011560; 2003/0011868; 2003/0020844; 2003/0025855; 2003/0034949; 2003/0038755; 2003/0053189; 2003/0096113; 2003/0102858; 2003/0132908; 2003/0137521; 2003/0137717; 2003/0151702; 2003/0189749; 2003/0214695; 2003/0214697; 2003/0222315; 2004/0008398; 2004/0012839; 2004/0014265; and 2004/0027327; and International Applications Publication Nos. WO 99/67678; WO 00/05704; WO 00/38000; WO 00/38001; WO 00/36560; WO 00/67110; WO 00/67327; WO 01/07961; WO 01/08241; WO 03/092077; and WO 03/107,315.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

One major reason why encapsulated electrophoretic displays can be produced inexpensively by printing processes is that the electrophoretic medium itself has substantial mechanical strength and cohesion; typically the individual capsules are bound together by a polymeric binder to increase the cohesion of the layer. Thus, not only can the display medium itself be printed, but as described in U.S. Pat. No. 6,177,921, an electrode may be formed by printing a conductive material directly on to the electrophoretic medium; alternatively, an electrode pre-formed on a substrate can be laminated on to the electrophoretic medium, which is able to withstand the heat and pressure required for such lamination without damage. In such printed or laminated structures, the mechanical strength and cohesion of the electrophoretic medium maintain the requisite spacing between the electrodes disposed on either side of the medium without any need for mechanical spacers or similar devices to control this spacing. Accordingly, if the electrodes (and any substrates attached thereto) are flexible, the encapsulated electrophoretic display can be curved or rolled without affecting the display qualities of the device; see, for example, Drzaic et al., A Printed and Rollable Bistable Electronic Display SID (Society for Information Display) 98 Digest, page 1131 (1998), which illustrates a flexible encapsulated electrophoretic display being rolled around a pencil without damage.

Furthermore, because of the mechanical strength and cohesion of the electrophoretic medium, such a medium can in principle be applied to any substrate on which an electrode can be provided; for example, the substrate could have an arbitrary three-dimensional shape, as opposed to an essentially laminar sheet which is curved in one dimension. Techniques such as sputtering may be used to apply electrodes to arbitrary three-dimensional shapes, but prior art techniques for applying an electrophoretic medium to such arbitrary shapes leave a great deal to be desired, especially given the need for careful control of the deposition of such a medium to produce optimum optical performance.

Display performance (e.g., its optical performance) and visual appeal (i.e., minimizing visual defects) depends critically on obtaining a high quality coating, that is coatings are preferably of uniform thickness (often a monolayer of capsules is desirable), and contain a high areal density of capsules with a minimum of defects. For example, regions where capsules are not in contact with the electrode or where the surface density of capsules varies laterally with respect to the substrate, or where the coating thickness varies, show up as a degraded dark or white states, non-uniformity in the optical state or graininess, or as non-uniformities during switching respectively.

Some of the printing/coating techniques described above can produce high quality printings/coatings of capsules on to planar or flexible substrates; during coating, flexible substrates are usually constrained so that at least one of the radii of curvature of the substrate is infinite, i.e., the substrate is held in a cylindrical form with the axis of the cylinder perpendicular to the direction of coating. In particular, certain of the aforementioned E Ink and MIT patents and applications describe the use of a metered slot coating technique to produce monolayer capsule coatings and lamination adhesive coatings suitable for use in commercial products.

However, as already mentioned these prior art techniques are not satisfactory for forming, on arbitrary three-dimensional shapes, electrophoretic medium coatings with a sufficiently uniform thickness to give optimum optical performance. While coating methods such as dip or spray coating can be applied to arbitrary three-dimensional shapes, it is difficult to or impossible to achieve uniform capsule monolayers over the substrate surface using these coating techniques.

Other problems encountered with slot coating techniques include:

chatter-like streaks parallel to the coating head (for example, due to vibrations in the coating apparatus); these streaks are believed to result from periodic bunching or jamming of capsules;

streaking in the direction of coating (i.e., perpendicular to the slot of the coating head), believed to be due to capsule jamming or non-uniform flows in delivery of capsules to the coating head;

less than desirable capsule contact (or wetting) with the optical face due to inadequate settling or deformability of the small capsules (of the order of 20-200 µm) typically used in encapsulated electrophoretic displays; and non-uniformities in coating thickness due to formation of multiple layers of capsules (see the aforementioned 2003/0137717 for a discussion of the advantages of forming only a single layer of capsules on a substrate).

The presence of these types of defects can adversely affect the appearance and optical performance of the display.

Also, as is well known to those skilled in slot coating technology, slot coating imposes limitations upon the viscosity and other physical properties of the material being coated, and typically requires the addition of slot coating additives to control the rheology of the coated material to ensure that the coating does not flow and develop non-uniformities in thickness prior to drying. As discussed in many of the aforementioned E Ink and MIT patents and applications, typically the capsules are mixed with a polymeric binder prior to coating, this polymeric binder serving to form the capsules into a coherent layer after coating and drying. The capsule/binder mixture is then coated on to a polymeric film substrate bearing a conductive coating of indium tin oxide (ITO) or a conductive polymer and dried to form a coherent layer on the conductive-coating bearing surface of the substrate; the opposed surface of the substrate forms the viewing surface of the final display. Although the binder serves several useful functions, including ensuring adequate adhesion of the capsule film to the substrate on which it is coated, excessive amounts of binder can hinder capsule contact with the electrode which is normally present on the substrate, and may also hinder the desirable flattening of the faces of the capsules in contact with the conductive coating (see, for example, the aforementioned U.S. Pat. No. 6,067,185). Because the binder typically has a substantial effect on the viscosity and other physical properties of the capsule/binder mixture, at least in some cases it may be difficult to reduce the amount of binder used and still maintain these physical properties at values compatible with slot coating.

Also, some of the aforementioned E Ink and MIT patents and applications (see especially 2002/0113770) describe displays in which more than one type of capsule is used, the plurality of types of capsules being arranged in a predetermined pattern on a substrate. For example, a full color display could make use of three different types of capsules, say white/red, white/green and white/blue arranged in stripes of triads; such a display could achieve full color without requiring a color filter of the type used in full color liquid crystal displays. However, while conventional printing techniques might be used to prepare large displays of this type having resolutions of (say) less than 10 lines per inch (approximately 0.4 lines per mm), producing high resolution displays of this type with resolutions of about 100 lines per inch (approximately 4 lines per mm) with such conventional techniques is very difficult. Again, while spray or ink jet coating might be used to apply the patterned coatings of capsules, producing monolayer capsule coatings using these methods will be difficult or impossible.

The present invention seeks to provide processes for the production of electrophoretic displays, and in particular for processes for depositing capsules on a substrate, which reduce or eliminate the problems of the prior art processes for depositing capsules described above.

SUMMARY OF INVENTION

Accordingly, this invention provides a process for forming a coating of an encapsulated electrophoretic medium on a conductive portion of a substrate, the process comprising:

dispersing in a fluid a plurality of capsules each comprising a capsule wall, a suspending fluid encapsulated within the capsule wall and a plurality of electrically charged particles suspended in the suspending fluid and capable of moving therethrough on application of an electric field to the capsule;

contacting the conductive portion of the substrate with the fluid; and applying a potential difference between the conductive portion of the substrate and a counter-electrode in electrical contact with the fluid, thereby causing capsules to be deposited upon the conductive portion of the substrate.

The term "conductive portion" of the substrate, as used herein, is not to be construed as requiring a degree of conductivity such as that normally associated with metals. The currents involved in the electrophoretic deposition of capsules in accordance with the present invention are so low that many materials normally thought of as semiconductors, or even some insulators, have sufficient conductivity to function as the conductive portion of the substrate in the present process. Whether a given material has sufficient conductivity can readily be determined empirically; however, typically this is not an issue, since as described in detail below, the present invention will normally be practiced by depositing the capsules on to one electrode (which may be formed, for example, from a metal layer, a conductive polymer or a conductive metal oxide) of the final display, and such an electrode will necessarily have sufficient conductivity to function in the present process.

In this process, the conductive portion of the substrate may comprise at least one electrode, and the potential difference may be applied to this at least one electrode, thereby causing capsules to be deposited upon this at least one electrode. In one preferred form of the process, the substrate bears at least first and second electrodes and the potential difference is applied to the first electrode, thereby causing capsules to be deposited upon the first electrode but not on the second electrode, the process further comprising: removing the substrate from the fluid; dispersing in a second fluid a plurality of second capsules each comprising a capsule wall, a suspending fluid encapsulated within the capsule wall and a plurality of electrically charged particles suspended in the suspending fluid and capable of moving therethrough on application of an electric field to the capsule, the second capsules being capable of displaying at least one optical characteristic differing from the optical characteristics displayed by the capsules deposited on the first electrode; contacting the second electrode with the second fluid; and applying a potential difference between the second electrode and a counter-electrode in electrical contact with the second fluid, thereby causing the second capsules to be deposited upon the second electrode but not upon the first electrode. In an especially preferred form of this process, the substrate bears at least first, second and third electrodes, the process further comprising: removing the substrate from the second fluid; dispersing in a third fluid a plurality of third capsules each comprising a capsule wall, a suspending fluid encapsulated within the capsule wall and a plurality of electrically charged particles suspended in the suspending fluid and capable of moving therethrough on application of an electric field to the capsule, the third capsules being capable of displaying at least one optical characteristic differing from the optical characteristics displayed by the capsules deposited on the first and second electrodes; contacting the third electrode with the third fluid; and applying a potential difference between the third electrode and a counter-electrode in electrical contact with the third fluid, thereby causing the third capsules to be deposited upon the third electrode but not upon the first and second electrodes. It will be appreciated that this three step process is well adapted for forming full color displays. Thus, for example, the first, second and third capsules may each be capable of displaying one of red, green and blue optical characteristics, or one of yellow, cyan and magenta optical characteristics.

The present process may include depositing a polymeric binder on the substrate. The polymeric binder may be deposited at the same time as the capsules, for example by including in the fluid a polymeric latex which is deposited at the same time as the capsules to form a polymeric binder surrounding the capsules. The polymeric latex may comprise a polyurethane latex.

The present process may further comprise depositing a lamination adhesive on a conductive portion of the substrate. The lamination adhesive may be deposited on the conductive portion of the substrate after deposition of the capsules thereon. In one process for depositing a lamination adhesive, the conductive portion of the substrate is contacted with a fluid containing the lamination adhesive and a potential difference is applied between the conductive portion and a counter-electrode in electrical contact with the fluid containing the lamination adhesive, thereby causing the lamination adhesive to be deposited upon the conductive portion.

The capsule-containing fluid used in the present process may be an aqueous fluid; since as discussed below, the capsule deposition process is typically sensitive to pH, the fluid may contain a buffer to control its pH. The fluid/capsule mixture may have a conductivity of at least about 10 µS/cm. Considerably higher conductivities, for example at least 1 mS/cm., may be useful.

In the present process, more than one layer of capsules may be deposited on the conductive portion of the substrate, and after removal of the substrate from the fluid, the substrate may be washed to remove some of deposited capsules, thereby leaving substantially a monolayer of capsules on the conductive portion of the substrate.

The present process is especially intended for use on substrates in which the portion of the substrate on which the capsules are deposited is non-planar, and in some cases curved in both dimensions (i.e., has two finite radii of curvature). Thus, the process of the present invention may be applied to substrates having arbitrary three-dimensional shapes.

In the present process, the contact between the conductive portion of the substrate and the fluid may be effected by immersing at least the conductive portion of the substrate in the fluid. Alternatively, the conductive portion of the substrate may be coated with the fluid, for example by slot coating. In a preferred form of such a slot coating process, the substrate comprises a conductive layer and the potential difference is applied between the conductive layer of the substrate and an electrode provided on the slot coating head.

For reasons explained in detail below, it is often convenient to carry out the present process on a substrate provided with a (uniform) conductive layer. To enable multiple types of capsules to be deposited upon such a conductive layer, the conductivity of this layer may vary with radiation exposure, a first portion of the conductive layer may be exposed to radiation while a second portion is not, and a potential may be applied to the conductive layer while the substrate is in contact with the fluid, thereby causing capsules to be deposited upon one of the first and second portions of the conductive layer but not upon the other. Alternatively, a first portion of the conductive layer may be covered with an insulating layer while a second portion is not, and a potential may be applied to the conductive layer while the substrate is in contact with the fluid, thereby causing capsules to be deposited upon the second portion of the conductive layer but not upon the first. Such an insulating layer is conveniently provided by covering the conductive layer with a photoresist, imagewise exposing the photoresist to radiation, and removing the photoresist from the second portion of the conductive layer.

BRIEF DESCRIPTION OF DRAWINGS

FIGS. 3A-3D are schematic side elevations of various stages of a process of the present invention for deposition of capsules on to a substrate bearing a photoconductive layer.

FIGS. 4A-4F are schematic side elevations of various stages of a process of the present invention for deposition of capsules on to a substrate, parts of which are covered with an insulating layer.

FIG. 16 illustrates the effect of excess ion concentration in the coating fluid during the experiments described in Example 6 below.

FIGS. 19A-19D are micrographs of capsule layers produced during the experiments described in Example 8 below.

DETAILED DESCRIPTION

Figure 1:
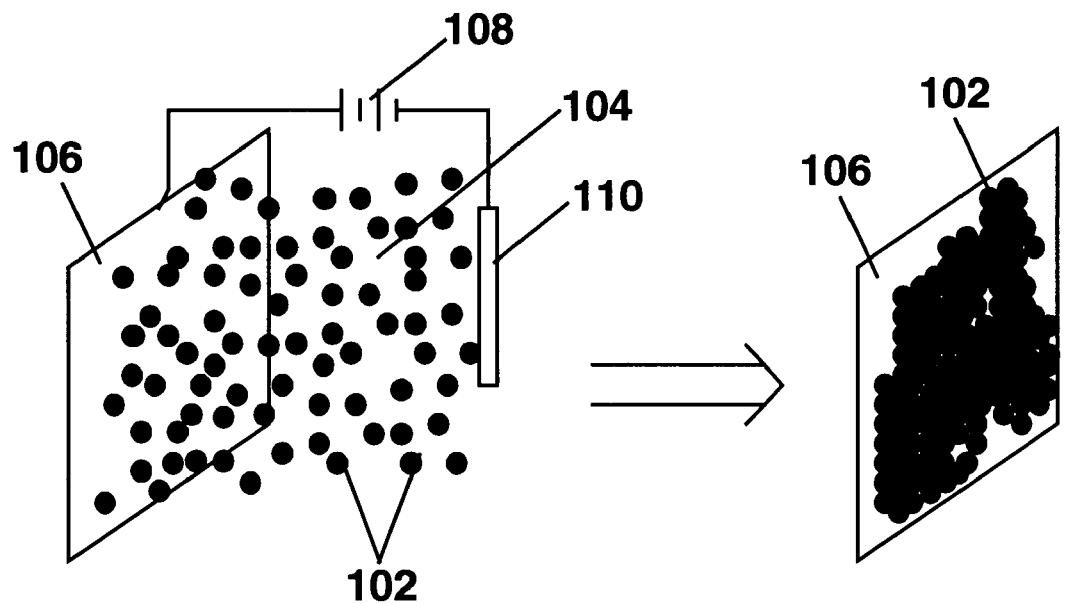
FIG. 1 is a schematic side elevation showing capsules being deposited during a process of the present invention.

As already mentioned, this invention provides a process for forming a coating of an encapsulated electrophoretic medium on a substrate. In this process, there are dispersed in a fluid a plurality of capsules, each of which comprises a capsule wall, a suspending fluid encapsulated within the capsule wall and a plurality of electrically charged particles suspended in the suspending fluid and capable of moving therethrough on application of an electric field to the capsule. A conductive portion of a substrate is contacted with the fluid; and a potential difference is applied between this conductive portion of the substrate and a counter-electrode in electrical contact with the fluid. The application of this potential difference causes capsules to be deposited upon the conductive portion of the substrate. Thus, in the present process the capsules are electrophoretically deposited on a predetermined portion of the substrate, and the process may hereinafter for convenience be referred to as the "electrophoretic capsule deposition process" or "ECD process".

In one variant of the present process, the substrate bears one or more electrodes, and a voltage is applied to these electrodes, simultaneously or sequentially, to deposit capsules on the electrodes. Sequential application of voltage to differing groups of electrodes permits the capsule-containing fluid to be changed between the application of voltage to the differing groups, and thus allows differing types of capsules to be deposited upon the differing groups of electrodes. Thus, the present process may advantageously be used to prepare the type of display previously discussed in which different types of capsules are patterned on to differing areas of a substrate, for example to produce a full color display. A typical full color display of this type will be an active matrix display having a common electrode (extending over the whole display, or at least a large number of pixels thereof) on one side of the electrophoretic medium and a matrix of pixel electrodes, one for each pixel of the display, on the opposed side of the electrophoretic medium. In such an active matrix display, there will of course be separate sets of pixel electrodes for the red, green and blue (or other colors used) pixels. The present process allows for easy patterning of the various types of capsules on to the pixel electrodes. For example, the matrix of pixel electrodes may first be contacted with a dispersion of "red" capsules (i.e., the capsules required to be patterned on to the red pixels of the display) and the potential difference applied only between the pixel electrodes for the red pixels of the display and the counter-electrode, so that the red capsules are deposited only upon the "red" pixel electrodes. After drying, and optionally curing, of the red capsule layer thus deposited, the process is then repeated for the green and blue capsules, thus ensuring that all three types of capsules are deposited upon the correct pixel electrodes. Obviously, an exactly similar process may be used to produce a yellow/cyan/magenta display.

Of the printing techniques described above, electrostatic printing is the most similar to the electrophoretic capsule deposition process of the present invention. However, there are some important differences between electrostatic printing and the process of the present invention. For example, electrostatic printing involves transfer of charge to a dielectric substrate; the substrate is then bathed in a low dielectric and low conductivity medium (e.g., air or a volatile organic solvent) that contains oppositely charged particles. These particles are attracted to the oppositely charged regions of the substrate. In contrast, the electrophoretic deposition process of the present invention involves using the substrate as an electrode, contacting the substrate with a fluid containing charged capsules and in electrical contact with a counter-electrode, and applying a voltage of appropriate polarity across the electrodes such that the capsules electrophorese to the substrate electrode and deposit there. In the process of the present invention, the fluid in which the capsules are dispersed may be an aqueous media, the high dielectric constant of which facilitates the ionic dissociation which leads to charging.

In practice, there are two principal variants of the present process. In the first (or "bulk fluid") variant, the conductive portion of the substrate is immersed in a bath of capsule-containing fluid, so that typically far more capsules are present in the bath than are required to form the desired capsule coating on the substrate, and the quantity of capsules deposited is controlled by the parameters of the coating process, for example current density and coating time. In the second (or "limited fluid") variant, a limited quantity of capsule-containing fluid is placed on the substrate, typically by slot coating, although other coating techniques such as curtain coating or spray coating may be employed, and the application of the potential difference serves to deposit the capsules from this limited quantity of fluid; in many cases, substantially all the capsules present in the limited quantity of fluid will be deposited on the substrate. These two main variants of the invention will mainly be described separately below.

FIG. 1 of the accompanying drawings illustrates schematically a bulk fluid process of the present invention. Capsules 102 are suspended in a liquid 104 to form a slurry. A substrate 106 provided with a conductive coating (not shown separately) of, for example, indium tin oxide (ITO), is immersed in the slurry and connected via a battery 108 to a counter-electrode 110 also immersed in the slurry. The battery 108 applies between the conductive coating on the substrate 106 and the counter-electrode 110 a potential difference such that, after a suitable deposition time, the capsules 102 are deposited upon the substrate 106, as illustrated on the right-hand side of FIG. 1.

The preparation of a complete electrophoretic display will of course involve more steps than the electrophoretic deposition process of the present invention. The complete process may include pre-treatment of the surface to improve adhesion of capsules and/or other components to the substrate. The complete process may include simultaneous or sequential coating of two or more components of the display, for example a binder (which surrounds the capsules to form a coherent electrophoretic layer, as described in the aforementioned E Ink and MIT patents and applications) and a lamination adhesive. In particular, as illustrated in certain Examples below, it is generally advantageous to deposit both the capsules and the binder by the electro-deposition process of the invention, and typically these two components may be deposited simultaneously. The lamination adhesive, if deposited by electro-deposition, will typically be deposited in a separate step from the capsules. The binder and/or adhesive may be polyurethane latex dispersions, again as described in the aforementioned E Ink and MIT patents and applications; however, other charged polymeric latices, charged soluble polymers developed for improved material and performance properties (for example reduced humidity sensitivity, better mechanical integrity, better adhesion, etc.) could also be used as surface pre-treatments, binders and adhesives in the present process. In addition, it may be possible to use uncharged components for surface pre-treatments or binders with an electrophoretic deposition process, where say physical adsorption to either the surface or charged capsules prior to electrophoretic deposition incorporates this component into the electro-deposited layer, and allows it to serve a purpose such as enhancing binding or adhesion.

As described in the Examples below, this invention also provides compositions and deposition conditions that enable production of coatings with desirable properties. As already noted, typically a desirable coating consists of a monolayer of capsules, with a high capsule surface area coverage (optimally 100% of course; however, many factors, such as the thickness of the capsule wall, presence of binder, and defects, reduce coating coverage) of the coated electrode substrate, good capsule-capsule and capsule-substrate contact or wetting. It is also desirable that the coating thickness be uniform over the coated area, that in the case of patterning, capsules be coated only on to the target positions of the pattern, and that capsules be coated with a minimum of binder. Other aspects of desirable coatings are that any damage to the coated electrode substrate, say by electrochemical degradation during deposition, be minimized by appropriate choice of formulation and deposition conditions, that the coating exhibits good wet adhesion to the particular substrate being coated. In accordance with preferred embodiments of the present invention, compositions and deposition conditions may be optimized to produce a desirable coating on a particular conductive substrate, for example, copper, platinum, gold, or indium tin oxide. This invention allows preparation of very thin (much less than 10 μm), uniform coatings of lamination adhesive, coatings which are not easily prepared with prior art machine coating processes and which, by means of the present process, may be applied directly onto a capsule layer coating.

The present invention extends to particular arrangements of the electro-deposition process in order to improve its efficiency or quality. A preferred sedimentation-aided process of the invention, and an electro-deposition process that can be used to produce roll-to-roll type coatings of capsules, and optionally adhesive, are described below.

As already mentioned, the second principal variant of the present process is a limited fluid process, in which a limited quantity of capsule-containing fluid is placed on the substrate. In a preferred form of this variant, the placement of the limited quantity of fluid is effected by slot coating, hence producing what may be termed a "slot coating electrophoretic capsule deposition process" or "SCECD process. The limited fluid variant of the present process will hereinafter be described principally with regard to its SCECD form, since it is believed that the necessary modifications to adapt the process to the use of other methods for depositing a limited quantity of capsule-containing fluid on to a substrate will readily be apparent to those skilled in coating technology.

In the SCECD process, the electrophoretic deposition is used in effect as a finishing step in a slot coating process. After slot coating a layer of the capsule/binder mixture in a manner generally similar to that described in the aforementioned E Ink and MIT patents and applications, electrophoretic deposition is used to finish and enhance the coating by forcing capsules into contact with the substrate (typically into contact with a conductive layer on the substrate). Use of the SCECD process improves the appearance and performance of displays fabricated from the coated substrates. The SCECD process does not require changes in the materials (capsule materials, binders and slot coating additives) used in the prior art slot coating processes described in the aforementioned E Ink and MIT patents and applications, since the preferred gelatin/acacia capsules used in such prior art processes are electrically charged and will electrophoretically deposit from the capsule/binder mixtures used in the prior art processes.

Figure 2:
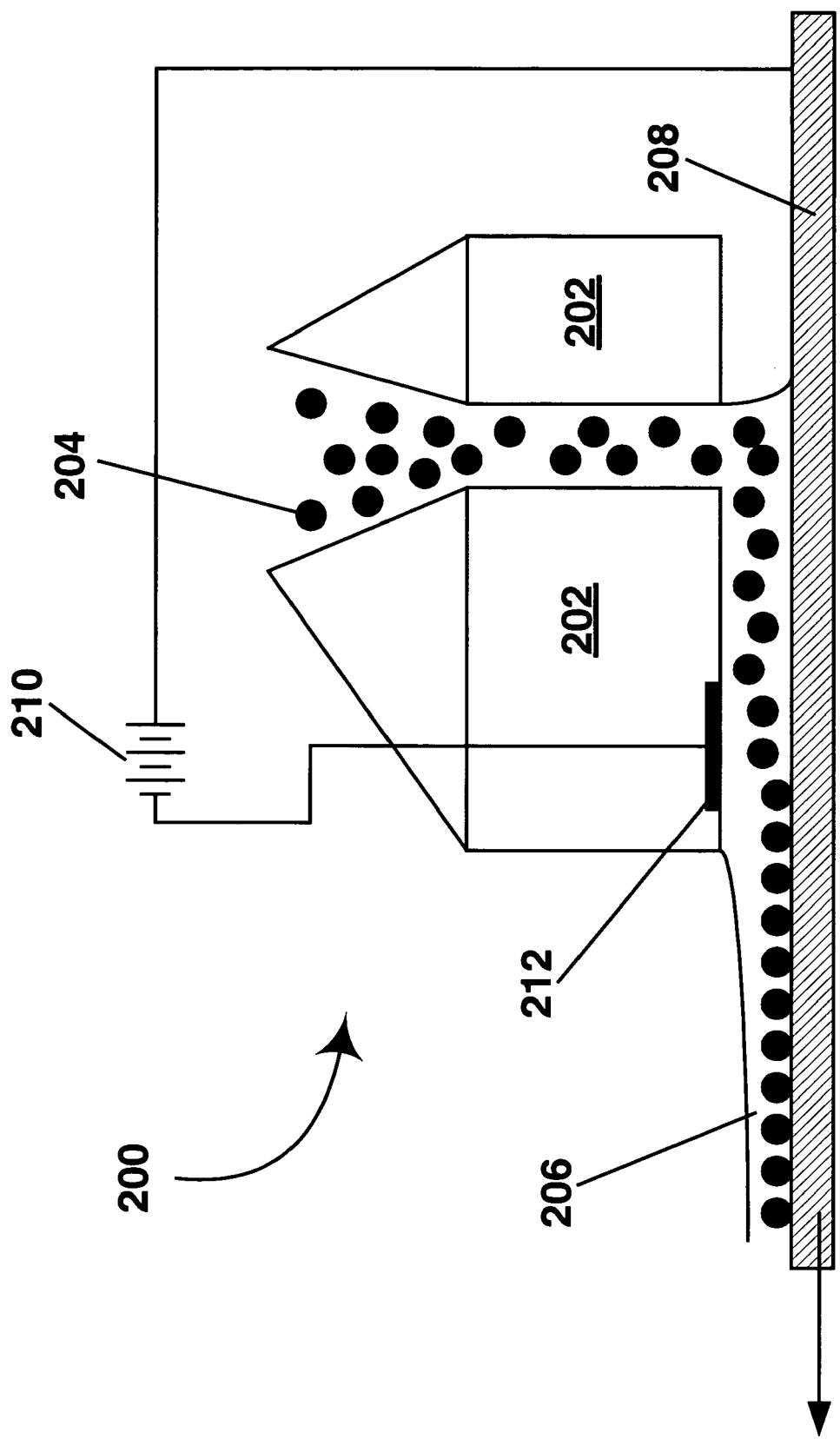
FIG. 2 is a schematic side elevation of a slot coating apparatus adapted for use in the process of the present invention.

A preferred form of the SCECD process will now be described with reference to FIG. 2 of the accompanying drawings, which is a schematic side elevation of a slot coating apparatus (generally designated 200) including a coating die 202 through which a mixture of capsules 204 and a binder 206 is coated on a substrate 208, which is moving relative to the die 202 from right to left as illustrated in FIG. 2, as indicated by the arrow. As in the prior art processes, the substrate 208 comprises a polymeric film bearing on its upper surface (as illustrated in FIG. 2) a conductive layer, but for ease of illustration this conductive layer is not shown separately in FIG. 2. A battery 210 applies voltage between a negative electrode 212, built into the die 202, and the conductive layer of the substrate 208, so that the capsules 204 and the binder 206 are electrophoretically deposited on to the conductive layer of the substrate 208 while the substrate is adjacent the electrode 212, the process being terminated locally as the upper face of the substrate 208 exits the coating head and is exposed to air.

The optimal separation of the negative electrode 212 from the slot portion of the die 202, the optimum length of contact of the electrode 212 in the direction of translation of the substrate 208, the optimum translation rate of the substrate 208, and the magnitude of the voltage or current applied, all affect the final properties of the coated substrate, and can all be determined and optimized with respect to appearance and performance of the coating and display into which it is fabricated.

The SCECD process has the following advantages:

(a) it enhances adhesion of capsules and binder to the conductive surface of the substrate, thus improving handling of the wet capsule/substrate film and allowing the amount of binder in the coated capsule film to be reduced, thus potentially improving the electro-optical properties of displays fabricated from the film;

(b) it mitigates lateral non-uniformities, such as those caused by streaking or chattering, by forcing capsules on to the conductive surface of the substrate;

(c) it forces capsules into better contact with the conductive surface of the substrate and therefore improves appearance and performance; and (d) it can be used without necessarily having to modify prior art capsule and capsule/binder formulations which have been optimized for other aspects of performance.

Although the SCECD process can be used without modifying prior art capsule and capsule/binder formulations, further consideration of how electrophoretic deposition and metered slot coating processes work suggests that the SCECD process could be further improved by certain changes to the capsule/binder mixture (slurry).

The slurries used in the prior art metered slot coating processes mentioned above typically consist of an aqueous dispersion of capsules, a binder phase which is a charge stabilized polyurethane colloidal latex, a rheological control additive such as a soluble polymer, and a surfactant to improve wetting. The binder requires a pH of at least 7 to 8 to remain stable, so the slurry pH is typically maintained at pH 8. At this pH, the binder lattices are negatively charged, and the capsules, which are encapsulated with coacervate formed from gelatin and acacia, are also negatively charged. Slurries of this composition and pH (without the added rheological control agent and wetting surfactant) are used in the Examples of the bulk fluid variant of the present invention described below, and will work in the SCECD process.

Since both the binder and capsules in these prior art slurries are negatively charged, they will both be deposited on to the substrate under electrophoretic deposition. While this is advantageous in the bulk fluid variant of the present invention, in which electrophoretic deposition is the only type of deposition effected and hence binder needs to be conveyed to the substrate along with capsules, in the SCECD process concurrent deposition of binder and capsules may make it difficult to control the distribution of binder normal to the substrate, thus rendering it difficult to obtain the desired capsule close packing (see the aforementioned 2003/0137717).

In the prior art (non-SCECD) metered slot coating processes described above, the amount and composition of the slurry delivered to the substrate per unit area coated are controlled, but the distribution of capsule and binder normal to the substrate, and therefore the capsule packing, is difficult to control and it is this distribution normal to the substrate that the SCECD process attempts to improve. However, it has been realized that, unlike a bulk fluid electrophoretic capsule deposition process, an SCECD process does not require electrophoretic binder deposition, because the proper amount of binder is inherently delivered by the metered slot coating. In fact, electrophoretic binder deposition concurrent with capsule electrophoretic deposition during the electro-deposition stage of an SCECD process may make it more difficult to improve capsule contact with the substrate which acts as the deposition electrode. Accordingly, certain modifications may be made in the coating slurry in order to take advantage of the unique aspects of the SCECD process.

More specifically, in an SCECD process, it is advantageous to use a binder which consists predominantly of uncharged latex particles (for example such particles sterically stabilized with a polymer layer) or which is an uncharged soluble polymer. The term "uncharged binder" will be used to cover both uncharged latex particles and uncharged soluble polymers. The use of such uncharged binders decouples electrophoretic deposition of the capsules from that of the binder. A capsule slurry having an uncharged binder enables one to use electrophoretic deposition to control and/or adjust packing and positioning of the capsules in the slurry applied by metered slot coating, because, with an uncharged binder, the electrophoretic deposition step controls only the vertical positioning and lateral packing of the capsules, and does not affect the disposition of the binder. Alternatively, an "intermediate" process, in which the binder contains a fraction of charged binder having the same polarity as that of the capsules, and a second uncharged fraction, may also be useful, because the charged fraction of the binder will be deposited preferentially on the substrate along with the capsules, thus controlling how the capsules contact the electrode adjacent the viewing surface of the display, so that an optimal positioning of the capsules can be effected.

An uncharged binder may consist of polyurethane, polyacrylate or any other common adhesive latex that is sterically or depletion stabilized. Steric stabilization occurs when latex particles have an adsorbed or chemically bound soluble polymer layer present at the latex particle surface. Adsorption is achieved by controlling the polymer architecture, for example by providing the polymer with anchoring blocks or grafted chains of poorly soluble polymer that tends to adsorb to the latex particle surface; an example would be a diblock copolymer. In general it will be desirable to work in aqueous capsule slurry media where typical gelatin-type capsule charge is controlled by the capsule chemistry and solution pH. Examples of non-polyelectrolyte polymers that can be used as the soluble part of the steric stabilizer for aqueous media are poly(ethylene oxide)s, poly(vinyl alcohol)s, polyethylene imine, poly(4-vinylpyridine), poly(vinylpyrrolidone), etc. There are many different types of anchoring chemistries and polymer architectures; a general review can be found in Napper, D. H. "Polymeric Stabilization of Colloidal Dispersions," Academic Press: London, 1983. Depletion stabilization occurs when a high molecular weight soluble polymer, examples of which include those listed above, is present in solution in the slurry at concentrations greater than the critical concentration for stabilization. This method of stabilization may be particularly advantageous if the soluble polymer concentration can be adjusted so that the soluble polymer also acts as a rheology modifier for slot coating of the slurry and/or if the soluble polymer acts to enhance the binding capability of the stabilized lattices.

Although the prior art slot coating processes described above use a binder consisting of latex particles, it is also possible to use a soluble polymer as the binder. This approach typically substantially increases the viscosity of the capsule slurry and if this increase is excessive it may present some difficulty in a slot coating process. However, the soluble polymer will also reduce or prevent capsule settling in the bulk slurry and thus allow more uniform delivery of the slurry to the slot coater. As with an uncharged latex binder, in a soluble polymer binder electrophoretic deposition finishing adjusts capsule positioning and packing in the coating; note that in principle the higher viscosity of the coating slurry does not present any fundamental difficulty with respect to using electrodeposition as a finishing method. Aqueous soluble polymers such as those listed above would be candidates for soluble polymer type binders.

As already indicated, the main advantage of the SCECD process, and similar limited fluid processes of the present invention, is improved control of positioning and packing of capsules in the capsule/binder layer delivered by metered slot coating. The slurry formulation approaches here described enable better control over how the electrophoretic deposition step functions to position the capsules. This improvement is achieved by either partially or completely decoupling (dependent upon the fraction of uncharged binder in the slurry) capsule deposition from binder deposition, thus enabling effective achievement of the positioning/packing objectives of the SCECD and similar processes.

As indicated above, both the bulk fluid and limited fluid processes of the invention can be use to deposit multiple types of capsules (typically, though not necessarily, capsules capable of displaying differing colors) on different sets of electrodes on a single substrate. However, the present process can also be used to deposit capsules in controlled areas of an unpatterned electrode.

The multi-step processes described above, in which different types of capsules are deposited upon different set of electrodes on a substrate, have the disadvantage that the capsules are necessarily deposited upon the pixel electrodes. In contrast, as described in the aforementioned E Ink and MIT patents and applications, when forming the prior art type of electrophoretic display in which the capsules are sandwiched between a backplane containing a matrix of pixel electrodes and a front substrate having a single continuous electrode extending across a large number of pixels and typically the whole display (this front substrate forming the viewing surface of the display), it is normally preferred to deposit the capsules on the continuous electrode. Coating microcapsules on to the substrate which forms the viewing surface of the display is advantageous because as the coating dries capsules can be made to flatten against the substrate and wet neighboring capsules to improve packing and increase the optical density of the coating, thereby generally improving the optical performance of the display. The exposed back surface of the coating has a roughness of several microns and capsules pucker and deform to compensate for the flattening and wetting occurring at the continuous electrode. In contrast, when a transparent electrode is laminated with a thin layer of adhesive to a capsule coating produced on the pixel electrodes, the electro-optic performance as measured from the rear surface of the capsule/binder coating is somewhat degraded compared to the front side. This degradation may be due to several factors, for example the presence of the adhesive layer in the optical path (this adhesive layer must be at least thicker than the roughness of the capsule layer, so is typically at least 10 μm thick), and/or the roughness and dimpling of the capsules. This degradation may be limited by improving the layer formation process or minimizing the thickness of the adhesive layer. Alternatively, this problem could be avoided completely by constructing a display with transparent transistors present on the front substrate.

Furthermore, as discussed in the aforementioned 2004/0027327, for commercial reasons it is advantageous to form, after capsule deposition, a so-called "front plane laminate" comprising, in order, a light-transmissive electrically-conductive layer, a layer of an electro-optic medium in electrical contact with the electrically-conductive layer, an adhesive layer and a release sheet. Such a front plane laminate can be prepared as a continuous web, cut to size, the release sheet removed and the laminate laminated to a backplane to form a display. Obviously, such a front plane laminate requires that the capsules be deposited upon a continuous front electrode, and hence such a front plane laminate cannot be prepared by the type of multi-step capsule deposition process described above, which deposits the capsules on discrete sets of pixel electrodes.

Thus, both from the point of view of maximizing the electro-optical performance of a display and from the point of view of commercial manufacturing convenience, it would be advantageous to modify the multi-step capsule deposition process described above to permit patterned deposition of capsules on to a continuous front plane electrode, and then align the resultant patterned electrode with the back plane containing a matrix of pixel electrodes. This invention provides such a modified capsule deposition process wherein the length scale defining the pattern is smaller than that describing the lateral size of the electrode surface on which the capsules are deposited.

Electrophoretic deposition coating processes are sensitive to the conductivity of the substrate on which coating is effected; in a substrate with non-uniform surface conductivity, regions with higher conductivity will tend to be coated to greater thickness than regions with lower conductivity. Therefore, by controlling the conductivity of the substrate to produce patterned regions of relatively high and low conductivity, patterned coatings can be produced.

Accordingly, one variant of the present process for forming patterned capsule coatings on a continuous electrode or conductive layer uses radiation sensitive conductive substrates as the electrode or conductive layer on which the capsules are deposited, the conductive substrate being chosen so that its local surface conductivity is affected by the intensity or wavelength of radiation incident on its surface. The change in surface conductivity, and therefore deposition efficiency, can be achieved in two ways, either through choice of electrode material or by masking the electrode with a patterning insulating layer, typically a photoresist patterned by a lithographic procedure. These two processes are illustrated schematically in FIGS. 3A-3D and 4A-4F, where FIGS. 3A-3D show a process using a photoconductive electrode material, while FIGS. 4A-4F show a lithographic process using a photoresist mask material.

FIGS. 3A-3D are schematic side elevations of various stages of an electrophoretic deposition process in which a radiation source is shone through a mask with transmissive and opaque regions on to a photoconductive electrode. More specifically, in the process of FIGS. 3A-3D, a first mask 302 is disposed adjacent a photoconductive electrode 304; this electrode 304 will typically be disposed on a substrate such as a polymeric film, but the substrate is omitted from FIGS. 3A-3D (and indeed from FIGS. 4A-4F) for simplicity. The first mask 302 is arranged to have apertures where it is desired to deposit a first type of capsules. The electrode 304 is then exposed through the mask 302 to ultra-violet radiation (indicated by the arrows in FIGS. 3A and 3C) to produce the desired pattern on the photoconductive electrode 304, while the electrode 304 has a voltage applied thereto while it is in contact with a first slurry 306 containing capsules of a first type. Regions of the electrode exposed to the ultra-violet radiation are more conductive than unexposed regions and accordingly capsule/binder electrodeposition takes place on the exposed regions. After deposition of the desired thickness of capsules is completed and the process stopped, the electrode 304 is removed from the slurry 306, washed with water to remove excess non-adhering capsules, and dried to produce islands 306' (FIG. 3B) containing capsules of the first type. The islands 306' will typically be in the form of elongate strips, which may extend across the full width of the display in a manner similar to the phosphor strips on many cathode ray tubes. The process is then repeated using a second mask 308 (FIG. 3C) and a second slurry 310 containing capsules of a second type to produce islands 310' (FIG. 3D) disposed between the islands 306'. Although the process shown in FIGS. 3A-3D only produces two different types of islands 306' and 310', in practice at least three different types of islands (for example red/green/blue or yellow/cyan/magenta) would normally be used.

It will be appreciated that a process similar to that of FIGS. 3A-3D could be practiced using a photosensitive layer the conductivity of which decreases on exposure to radiation, in which case the capsules would be deposited on the non-exposed regions of the continuous electrode.

FIGS. 4A-4F are schematic side elevations of various stages of an electrophoretic deposition process using a lithographic process. More specifically, in the process of FIGS. 4A-4F, a first mask 402 is disposed adjacent an electrode 404, which has previously been coated with a thin uniform layer of a positive photoresist 406 by any convenient method, such as spin coating. The electrode 404 is then exposed through the mask 402 to ultra-violet radiation (indicated by the arrows in FIGS. 4A and 4D) to produce the desired pattern on the photoresist 406, which is then developed using a developing solution in the conventional way to remove the regions of the photoresist exposed to the ultra-violet radiation, leaving islands 406' (FIG. 4B) of photoresist covering parts of the electrode 404. The electrode 404 is then contacted with a first slurry 408 containing capsules of a first type, and electrophoretic capsule deposition is effected on to the exposed regions of the electrode 404. After deposition of the desired thickness of capsules is completed and the deposition process stopped, the electrode 404 is removed from the slurry 408, washed with water to remove excess non-adhering capsules, and dried to produce islands 408' (FIG. 4C) containing capsules of the first type. The process is then repeated (although of course no further deposition of photoresist is needed) using a second mask 410 (FIG. 4D) and a second slurry 412 containing capsules of a second type to produce islands 412' (FIG. 4F) disposed between the islands 408'. Again, although the process shown in FIGS. 4A-4F only produces two different types of islands 408' and 412', in practice at least three different types of islands (for example red/green/blue or yellow/cyan/magenta) would normally be used; obviously, in such a process producing three types of islands of different colors, the exposure step of FIG. 4D will not remove all remaining photoresist 406' but only a portion thereof.

With regard to the "photoconductive electrode material" approach to varying conductivity, it should be noted that the surface conductivity of ITO, the preferred front electrode material in most of the aforementioned E Ink and MIT patents and applications, when in contact with water, is known to dependent on the intensity of ultra-violet radiation incident thereon. According to a number of authors (see Morrison, S. R., "Electrochemistry at semiconductor and oxidized metal electrodes," Plenum Press, New York: 1980; Bocarsley, A. B.; Tachikawa, H.; and Faulkner, L. R. in "Laboratory techniques in electroanalytical chemistry," 2nd edition, eds. Kissinger, P. T. and Heineman, W. R., 855898, Marcel Dekker, New York: 1996; and van den Meerakker, J. E. A. M.; Meulenkap, E. A.; and Scholten, M., "Photochemical characterization of tin doped indium oxide," J. Applied Phys., 74, 3282-3288, (1993)), this variation in surface conductivity is apparently the result of a redox reaction that produces hydrogen and oxygen at the surface, this redox reaction in turn being promoted by the ultra-violet radiation generated hole-electron pairs at the ITO/water interface. The change in conductivity of radiation-exposed regions of the electrode is great enough to influence the electrophoretic deposition coating process, as has been demonstrated in Hayward, R. C.; Saville, D. A.; Aksay, I. A. "Electrophoretic assembly of colloidal crystals with optically tunable micropatterns," Nature, 404, 56-59, (2000) for polystyrene lattices.

Other photoconductive materials that exhibit changes in conductivity on exposure to radiation are amorphous silicon and titanyl phthalocyanine (dispersed in a polymeric binder matrix). In both cases a layer of the photoactive conductive material deposited on a support, such as glass or poly (ethylene terephthalate) (PET) or on a layer of ITO on glass or PET, could be used to generate patterned capsule coatings as described above.

With regard to the mask or lithographic approach exemplified by the process of FIGS. 4A-4F, those skilled in photolithography will recognize that as a result of the extensive use of photoresists in the microelectronics fabrication industries, a wealth of different materials and solvents are available for use, so that it unnecessary to list specific materials; instead, the following discussion will focus on some material characteristics that are important in the process of the present invention. Since electrophoretic deposition of the capsules is normally conducted in aqueous media, it is important that the photoresist have very limited solubility and swellability in aqueous or polar media. Since previously-deposited capsules and binder will typically be exposed to the developing solution used in subsequent stages of the process, it is important that the developing solutions be chosen to minimize damage to the capsule layer. Obviously, use of aqueous developers, either acid or basic, would be acceptable. Also it is likely that the typical hydrophilic gelatin capsule walls present in the capsule layer will tolerate some exposure to non-polar developing solutions.

As already mentioned, the principal advantage of processes of the present invention similar to those described with reference to FIGS. 3A-3D and 4A-4F is that they enable electrophoretic deposition of patterned capsule/binder layers on to a continuous top plane (front) electrode, and such deposition offers significant electro-optical and appearance advantages over similar patterned deposition on to backplane electrodes. Although patterned deposition on to a top plane electrode ultimately requires alignment of the patterned layer with the backplane addressing (pixel) electrodes, this alignment step is similar to that commonly used in assembling color liquid crystal displays and is therefore well understood. Although deposition directly on to the backplane electrodes avoids an alignment step, the backplane transistor array in an active matrix display is one of more expensive components of the display and any defects in the coating process would require scrapping or reworking of the backplane. In addition, deposition on to the backplane electrode is fundamentally a batch process, while even high resolution patterned deposition on a front plane electrode appears amenable to use of high volume continuous processes, for example on a roll-to-roll basis, in a manner similar to the processes for the preparation of front plane laminates described in the aforementioned 2004/0027327.

Of the various forms of the process of the present invention, a process of the type shown in FIGS. 3A-3D using a photoconductive electrode such as ITO is likely to be the most economical, simple and effective. In addition, ITO has acceptable color properties for use as a top plane electrode, while materials such as amorphous silicon and titanyl phthalocyanine appear somewhat red and blue and thus may be less desirable as a top plane electrode material. A lithographic process of the type shown in FIGS. 4A-4F, although more involved, has the advantage that it will produce highly selective deposition patterns compared to the photoconductive ITO approach. In a lithographic process, portions of the pattern covered by photoresist are physically masked from the electrophoretic capsule deposition process and therefore capsule deposition can occur only at the exposed electrode surface.

The following Examples are now given, though by way of illustration only, to show details of particularly preferred reagents, conditions and techniques used in the process of the present invention.

The capsules used in the following Examples were prepared substantially as described in Paragraphs [0069] to [0075] of the aforementioned 2002/0180687. The capsules contained a polymer-coated titania, a polymer-coated carbon black, a charging agent (Solsperse 17000), and a surfactant (Span 85) in a hydrocarbon suspending fluid (Isopar G). The suspending fluid contained 0.93 weight percent of polyisobutylene, $M_n$ 850,000, polydispersity 3. The capsule walls were formed from gelatin/acacia, except as otherwise noted below. The capsules were formed as described in the aforementioned 2002/0180687, except that a broader range of capsule sizes (20-60 μm) were selected, with an average capsule size of 40 μm and a minimum of 85 percent of the capsules having diameters of 30 to 50 μm. The capsules dispersions (slurries) typically consisted of capsules at weight fraction $x_c$, and a binder (a 3:1 w/w mixture of NeoRez 9314 and NeoRez 9621) at weight fraction $x_b$. pH was adjusted when necessary by addition of 1 M ammonium hydroxide or 1 M acetic acid, or a 0.1 M $KH_2PO_4$ buffer solution (pH 8). The pH of the binder was 8. Salt concentration was adjusted by addition of 1 M ammonium chloride.

Figures 5A, 5B:
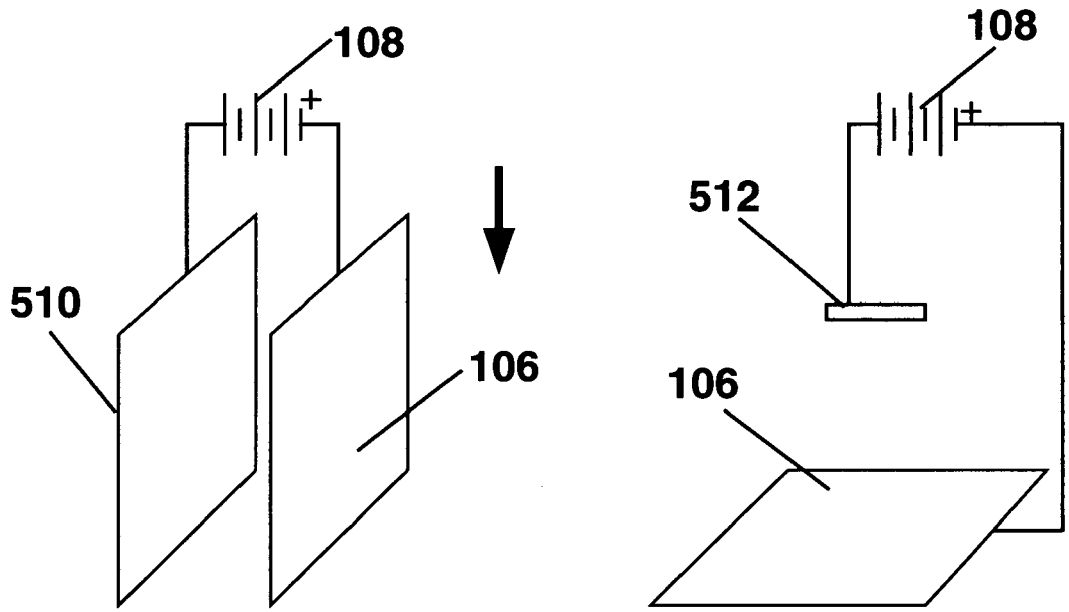
FIGS. 5A and 5B illustrate two different types of apparatus which may be used in the process of the present invention.

Unless otherwise specified, the electrophoretic deposition experiments in the Examples below were conducted using one of the two types of apparatus shown in FIGS. 5A and 5B. Both these types of apparatus are generally similar to that shown in FIG. 1 and include a substrate 106, on which the capsules are deposited, and a battery 108. The "vertical" apparatus shown in FIG. 5A differs from that shown in FIG. 1 only in that the small counter-electrode 110 shown in FIG. 1 is replaced by a plate counter-electrode 510 of substantially the same size as the substrate 106 and extending parallel thereto separated by a 10 mm gap. The "horizontal" apparatus shown in FIG. 5B is so called because the substrate 106 is arranged in a horizontal plane, with a platinum counter-electrode 512 disposed above the center of the substrate 106.

The vertical apparatus was generally used for voltage source experiments, since in the horizontal apparatus, the gap between the substrate 106 and the counter-electrode 512 was difficult to set accurately; the horizontal apparatus was used with current sourcing. The horizontal apparatus takes advantage of gravitational settling of microcapsules onto the deposition electrode 106, whereas significant settling during the course of deposition with the vertical apparatus may impact deposition uniformity.

EXAMPLE 1

Electrophoretic Deposition of Microcapsules

Figure 6:
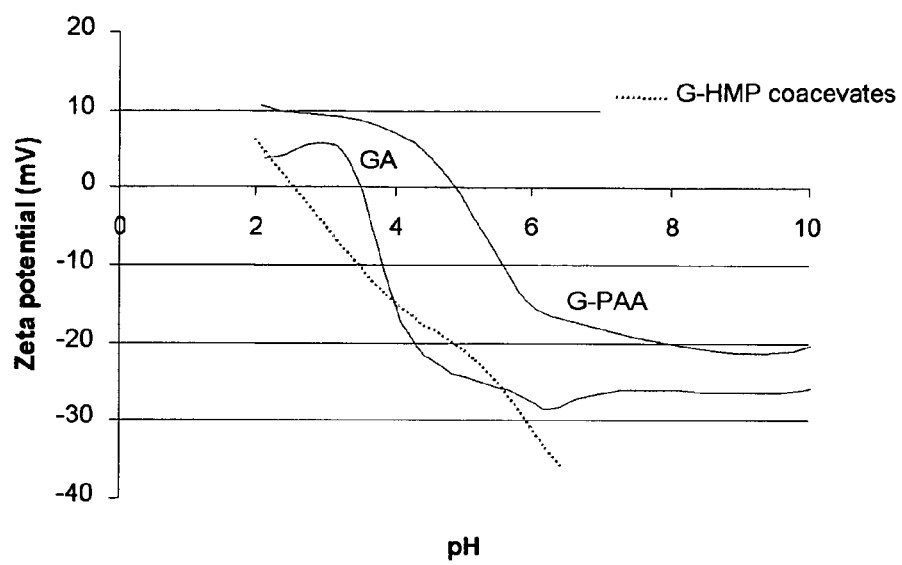
FIG. 6 is a graph showing the variation of the zeta potential of various types of capsule wall material with pH, as determined during experiments described in Example 1 below.

Preliminary experiments were conducted to determine the zeta potential of several different gelatin coacervates in water (coacervate nomenclature: GA=gelatin-acacia, G-PAA=gelatin-polyacrylic acid, G-HMP=gelatin-hexametaphosphate) as a function of pH and the results are shown in FIG. 6. For the GA coacervate, it was found that, as pH increased, coacervates formed from equal weights of gelatin and acacia become increasingly negatively charged. It appeared likely that adjusting the ratio of gelatin to acacia would affect the pH of zero charge, approximately 3.5 for the GA shown in FIG. 6, and also the plateau value of zeta potential at high pH.

Figure 7A:
FIGS. 7A-7D are micrographs of various capsule-coated surfaces produced in the experiments described in Example 1 below.
Figure 7B:
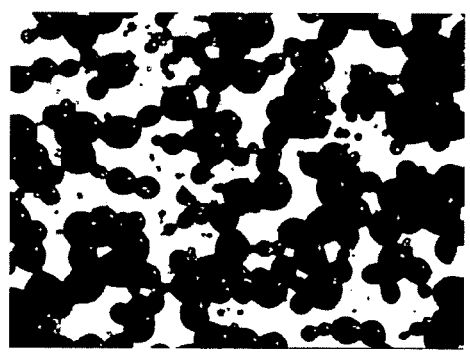
Figure 7C:
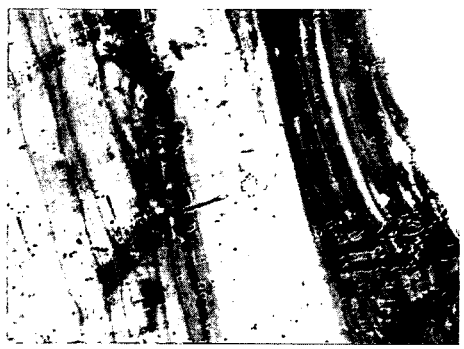
Figure 7D:
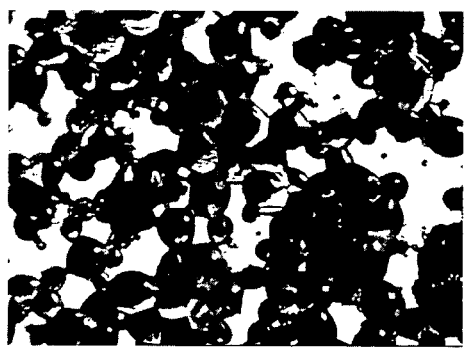

Electrophoretic deposition experiments were then conducted using the vertical apparatus of FIG. 5A with glass coated with ITO (glass/ITO) for both the substrate and counter-electrode and capsule slurries with $0.05<x_c<0.5$. The voltage used ranged from 1 to 50 V (typically about 5 V) and deposition times ranged from 10 to 1000 seconds (typically about 100 seconds). These slurries did not contain any binder ($x_b=0$). At low pH (<5), capsules were found to coat both substrate and counter-electrode, but as the pH was raised to values >5.5, capsules were found to deposit only on the positive substrate. FIGS. 7A-7D shows micrographs of some typical coatings on positive and negative electrodes for two different pH values that illustrate this change in capsule behavior with pH. FIG. 7A shows the negative counter-electrode at pH 4.8, FIG. 7B the corresponding positive electrode (substrate), FIG. 7C the negative electrode at pH 6, and FIG. 7D the corresponding positive electrode. It will be seen that FIG. 7C shows considerable plating or browning of the negative electrode but little or no capsule deposition. In all cases the negative electrode showed some browning or silvering, indicating there was electrochemical degradation of the electrode surfaces. FIG. 7C suggests that the intensity of browning was worse at higher pH.

The coatings obtained were generally thick (much more than a monolayer of capsules) after prolonged deposition; however, on removal and washing of the electrode, less than a monolayer coating of capsules adhered to the electrode surface. The amount of capsules adhering to the positive electrode (substrate 106) increased with deposition time or voltage; however, the maximum fraction of electrode surface coated with adhering capsules was typically only about 65-80% after washing. Hereinafter, references to the coating thickness of the deposited layer refer only to the thickness of the coating of adhering capsules after washing; the actual amount of capsules deposited prior to washing may have been considerably greater.

EXAMPLE 2

Effect on Deposition of Electrode Material

The electrophoretic deposition experiments of Example 1 were repeated using glass/ITO, poly(ethylene terephthalate) (PET)/ITO, platinum, chrome, and copper substrates. In all cases, coatings were achieved by adjusting slurry pH and/or the encapsulation conditions, but all coatings without binder were typically limited to less than monolayer coverages of 65-80% after washing. This list of electrode materials on to which capsules can be electrophoretically deposited and adhered is not comprehensive; many more materials could presumably be coated by adjusting slurry pH, or capsule chemistry to promote the electrochemistry with a particular surface material that results in adhesion. The surfaces used were not intentionally patterned in any way to aid deposition; however, it was observed that in some cases apparent defects on the surface were preferentially coated with capsules (fabrication of patterned coatings is discussed in Example 9 below).

EXAMPLE 3

Electrochemical Degradation

As already noted significant electrochemical degradation of the positive electrode (deposition substrate) was observed to occur with certain electrode materials; this was most evident with substrates where a very thin conductive layer was deposited onto a nonconductive support, for example ITO on PET or chrome on glass. It was found that significant electrode degradation could interrupt the deposition process or cause highly laterally non-uniform coatings to develop. Generally as deposition proceeds, for example at constant voltage, electrochemical degradation can be recognized as a rapid decrease in current (vice versa for constant current conditions). Note that at constant current (with a suitable high voltage current source) deposition and electrochemical process proceed until the electrode fails catastrophically, whereas at constant voltage, the deposition process and degradation slow down as the experiment proceeds because the current drops off.

For example, the particular ITO on PET substrate used was coated with a very thin ITO layer, less than 100 Å (10 nm) thick. By measuring the surface resistivity of the ITO film before and after deposition, the degree to which the ITO was degraded was monitored. The slurries used had $x_c=0.37$ and the horizontal apparatus of FIG. 5B was employed. The deposition current (I) was 1 mA for a deposition time ($t_d$) of 200 seconds. Since the thickness of the conductive film was not known, surface resistivity was defined as measured resistance multiplied by the ratio of electrode length to electrode gap. In the case of ITO, Table 1 below shows that the electrochemical degradation was affected by slurry pH, being reduced by lowering slurry pH, or by buffering at higher slurry pH. The lack of visible negative electrode degradation at pH 5, versus pH 6 in FIG. 7C, suggests that further improvements can be made by going to still lower pH than indicated in Table 1. Table 1 shows that, by appropriate choice of slurry conditions, negative effects on the deposition electrode can be minimized. Experiments with thicker ITO films (200 to 2000 Å, 20 to 200 nm on glass) showed that capsule deposition could be accomplished with less than 10% change in surface resistivity.

TABLE 1

Effects of electrodeposition on surface resistivity of PET/ITO films

| slurry conditions | surface resistivity (Ω) initial (dry) | surface resistivity (Ω) post deposition (dry) |
|---|---|---|
| pH = 8.5 | 680 | $1.9 \times 10^6$ |
| pH = 6.0 | 625 | $1.8 \times 10^4$ |
| pH = 8.0, $KH_2PO_4$ buffer | 625 | $4.6 \times 10^4$ |

EXAMPLE 4

Effects of Binder

Experiments similar to those carried out in Example 1 above were performed with the addition of a binder to the capsule slurry. The binder used was a polyurethane latex dispersion in which the latices were stabilized by negative surface charge so that the binder deposited on the positive electrode along with the capsules. The charging chemistry for this binder required a pH of at least 7-8, so all capsule slurries containing the binder were prepared at least at pH>7. As noted in Example 3, high pH negatively impacted degradation of the ITO electrode surface, so it was necessary to prepare coatings on glass/ITO electrodes that had thicker ITO coatings, thickness approximately 200 nm.

The electrodeposition experiments were conducted using the vertical apparatus of FIG. 5A; the applied voltage was constant at 4 V and deposition time was varied. The surface area coated ($A_{coat}$) was typically about 2.5 to 3.75 cm². The ratio of capsules to binder was varied from 6 to 30, while in all cases $x_c$ was approximately 0.35 to 0.39.

Figure 8:
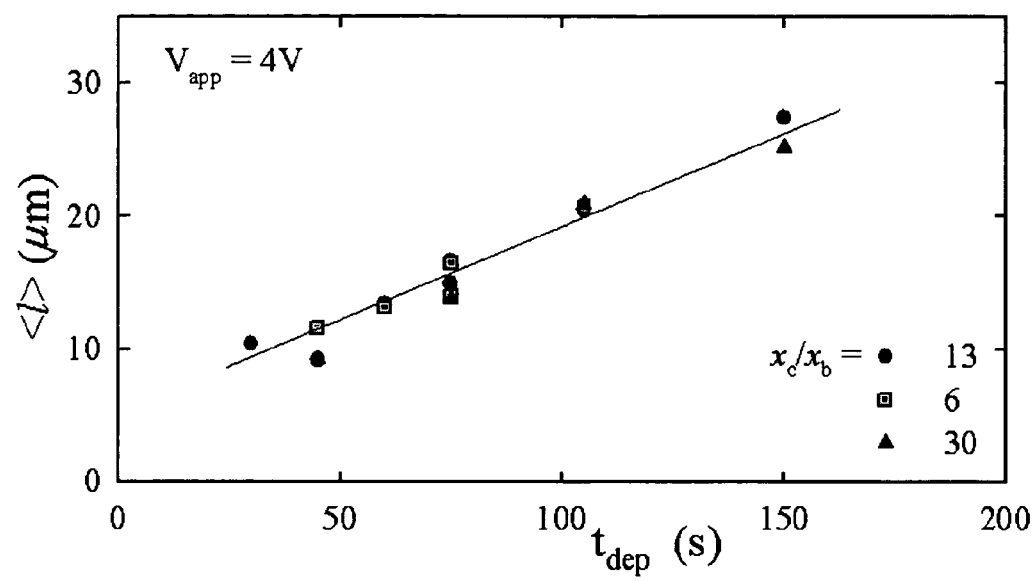
FIG. 8 is a graph showing the variation of capsule layer thickness with electrophoretic deposition time, as determined during experiments described in Example 4 below.

FIG. 8 of the accompanying drawings shows coating thickness as a function of electrophoretic deposition time ($t_d$). The thickness was measured by profilometry on dried coatings and it is the average thickness of a slice of the layer roughly 2 to 5 mm in length. The coatings typically had a roughness of 5 to 8 μm, due to capsule size distribution and packing; however, average thickness did not vary significantly with position except near the edges. Within 1 mm of the edges of the conductive substrate, the coating was typically thicker, perhaps due to significant non-uniformities in electric field.

It will be seen from FIG. 8 that the inclusion of the binder led to significant improvement of capsule adhesion onto the positive electrode substrate. Capsule coatings ranging in thickness from less than one monolayer to more than 7 to 8 layers thick were obtained. FIG. 8 shows that layer thickness increased linearly with td, approximately independent of the capsule/binder ratio.

Figure 9A:
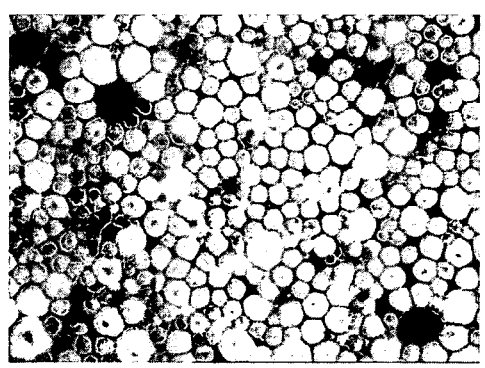
FIGS. 9A-9B are micrographs of capsule-coated surfaces produced in the experiments described in Example 4 below.
Figure 9B:
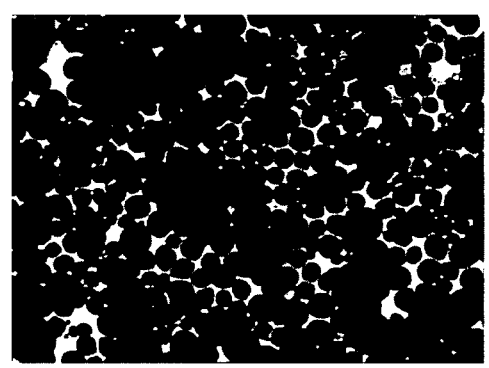
Figure 10:
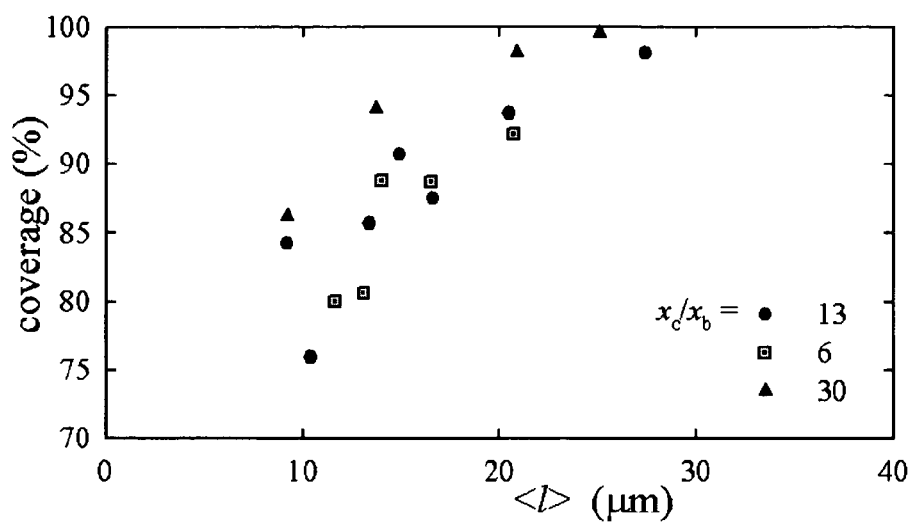
FIG. 10 is a graph showing the variation of surface coverage with capsule layer thickness, as determined during experiments described in Example 4 below.
Figure 11A:
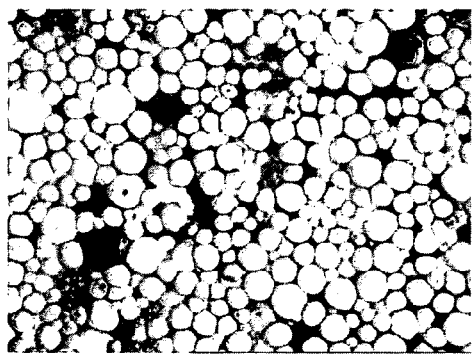
FIGS. 11A-11C are micrographs of capsule-coated surfaces produced in the experiments described in Example 4 below.
Figure 11B:
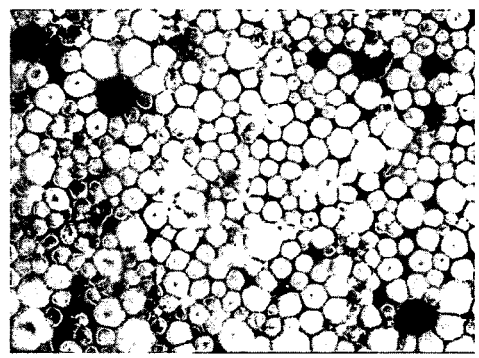
Figure 11C:
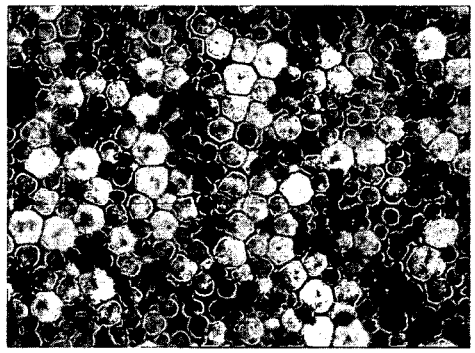

FIGS. 9A and 9B show reflected light and transmission micrographs respectively of a representative layer that was prepared at $x_c/x_b$=13 and had an average thickness of 14.3 μm. Fractional surface coverage was determined by measuring the amount of light areas in FIG. 9B and corresponding micrographs from other experiments. FIG. 10 shows surface coverage as a function of layer thickness for the same layers as in FIG. 8. Significantly better surface coverage was obtained as binder concentration was decreased because the amount of binder incorporated into the layer affects capsule packing as illustrated in FIGS. 11A-11C, which show three layers having similar thicknesses but prepared at different binder concentrations, with FIG. 11A showing a layer having $x_c/x_b$=6 and an average thickness of 14.9 μm, FIG. 11B showing a layer having $x_c/x_b$=13 and an average thickness of 14.0 μm, and FIG. 11C showing a layer having $x_c/x_b$=30 and an average thickness of 13.7 μm. The layers are each addressed to their white state, but the brightness of the pictures is not correlated with the relative white states of the layers. As binder concentration decreases, capsule flattening against the optical interface improves and capsule-to-capsule packing also appears to improve. There appears to be an optimum concentration of binder in the deposited layer; enough binder must be incorporated to give the layer strength and adhesion, but a lower binder concentration is desirable for better capsule wetting as shown in FIGS. 11A-11C.

Figure 12:
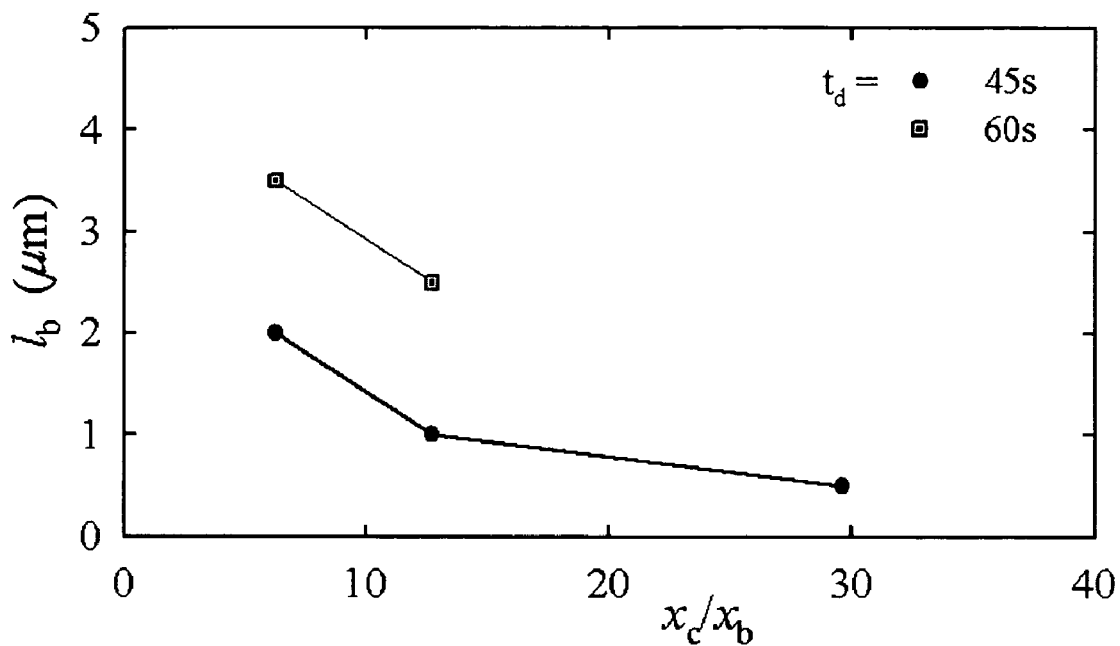
FIG. 12 is a graph showing the variation of the thickness of deposited, dried binder as a function of the capsule:binder ratio in the void regions of capsule layers produced in the experiments described in Example 4 below.

FIG. 12 is a graph showing the thickness of deposited, dried binder ($1_b$) as a function of the capsule:binder ratio ($x_c/x_b$) in the void regions of capsule layers having less than a full monolayer of capsules. This Figure shows that altering the binder concentration in the slurry used to deposit the capsules affected how much binder was incorporated into the coating under constant deposition conditions. In the experiments used to generate FIG. 12, sub-monolayer capsule coatings were dried and the layers were characterized by profilometry; the difference in baseline height between masked regions (not exposed to the capsule slurry) and regions in the coating without capsules was taken as the thickness of binder deposition, and this height was reported as $1_b$. It should be recognized that the capsule:binder ratio in the deposited layer will not necessarily be the same as in the bulk slurry because the capsules and binder are likely to have differing electrophoretic mobilities. In addition, the lateral uniformity (on a sub-capsule length scale) of deposited binder was not characterized and micrographs of coated layers run to long deposition times suggest that binder does in part displace capsules from contact with the ITO and neighboring capsules rather than just deposit onto the exposed surfaces of deposited capsules.

Figure 13:
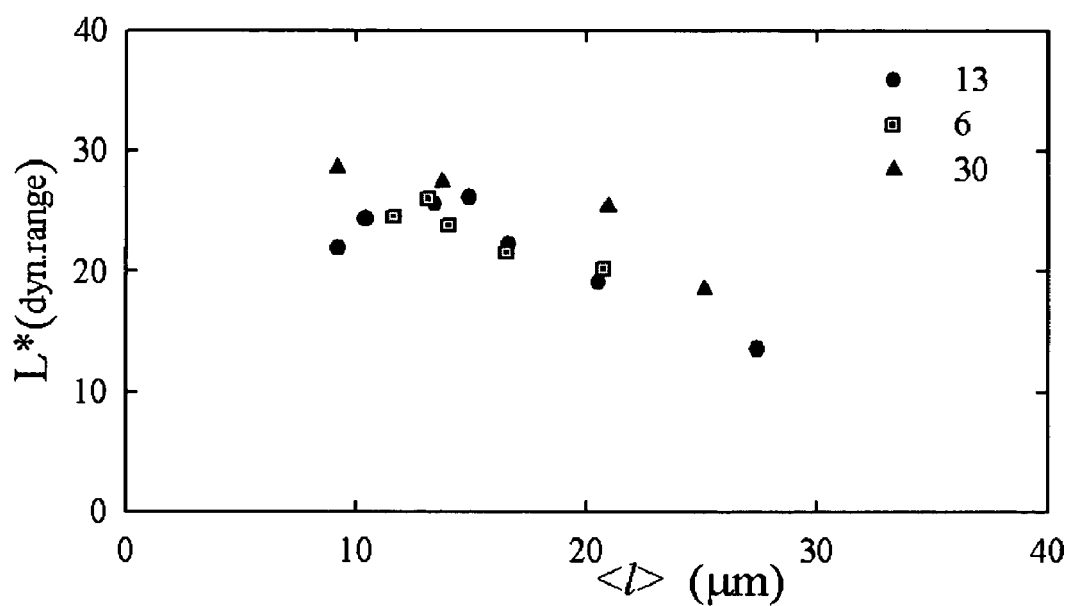
FIG. 13 is a graph showing the variation in optical performance with capsule layer thickness of capsule layers produced in the experiments described in Example 4 below.

The deposited coatings were made into displays by laminating PET/ITO, coated with approximately 20 μm of a lamination adhesive, to the deposited coatings. Electro-optical performance of these displays was measured at steady state 15 V direct drive switching; the rest interval between switches was 0.3 seconds and the pulse length for switching was 0.4 seconds. FIG. 13 shows the optical performance of the layers as a function of layer thickness. Electro-optical performance is presented as the dynamic range in L* (i.e., the difference between the L* of the white and dark states of the display, where L* has the usual CIE definition) in order to remove the effects of background and layer defects on the white and dark states. From FIG. 13, it will be seen that, as coating coverage increases, so does dynamic range, but that eventually the dynamic range goes through a maximum as layer thickness increases and the constant impulse conditions used to switch the optical states are no longer adequate to switch the display (i.e., at greater than monolayer coverages dynamic range would apparently be constant if the impulse used to switch the displays were adjusted to account for the change in electric field across the capsules). FIG. 13 suggests that capsule flattening at low binder concentrations slightly improves electro-optical performance; effects on appearance factors such as graininess have not yet been quantified but are likely impacted by capsule wetting also.

It is likely that other binders or soluble polymers could produce similar effects as observed with the binder used in these experiments. For example, for electrophoretic deposition on PET/ITO, it may be advantageous to use a polyurethane binder stabilized with a charging chemistry effective at lower pH than the binder used in these experiments in order to allow the slurry to be prepared at lower pH. Also, colloidal latices other than polyurethanes, for example polyacrylates, may be equally effective as binders. Although it would appear at first glance necessary for a binder used in electrophoretic deposition of capsules to have the same charge polarity as the capsules at the pH used for deposition, uncharged lattices or soluble polymers may also be effective as binders in such deposition processes. In addition to latex particle binders, polyelectrolyte chemistries that are appropriately charged may also serve as effective binders, e.g., gelatins, acacia, polyacrylic acid, etc.

EXAMPLE 5

Effects of Deposition Rate

For any specific slurry composition and temperature, the deposition rate in the process of the present invention can be adjusted by changing the deposition voltage or current. It has been found that the deposition rate affects several aspects of the quality of the deposited layer, for example, the adhesion properties of the layer (and thus how sensitive the layer is to the conditions of any post deposition washing or handling), and the layer thickness uniformity over the coated area of the substrate.

In experiments to investigate the effect of deposition rate, capsule/binder coatings were prepared at a constant $x_c/x_b$=20, using the horizontal apparatus of FIG. 5B. Coatings were prepared over a range of current densities ($I/A_{coat}$, where I is the current and $A_{coat}$ the coated surface area of the positive electrode) and over a range of deposition times ($t_d$)

where current density was adjusted both by adjusting I and $A_{coat}$ (although the range for I was much greater). The average thickness of the deposited layer was measured by profilometry and coating uniformity was judged by microscopy and macroscopic appearance of the coated area.

Figure 14:
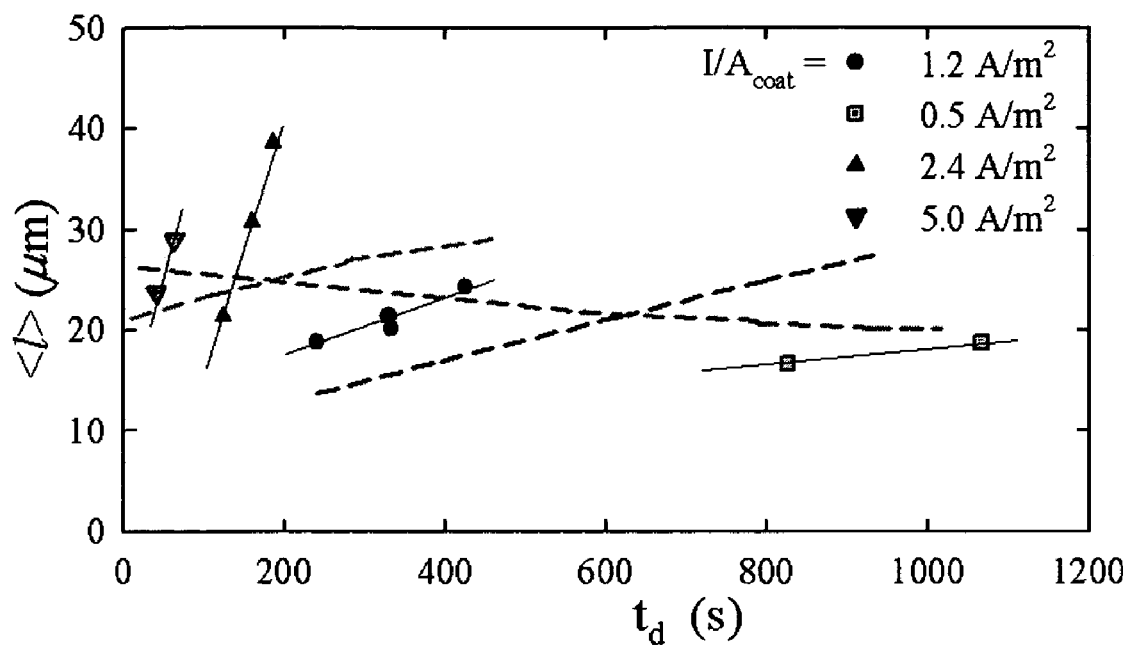
FIG. 14 is a graph showing the variation in average capsule layer thickness with deposition time for a range of current densities for capsule layers produced in the experiments described in Example 5 below.

FIG. 14 shows average layer thickness (<l>) as a function of $t_d$ for a range of current densities. From this Figure it will be seen that coating thickness increased linearly with $t_d$ at constant $I/A_{coat}$. Re-scaling the deposition time by the current density, for example to $It_d/A_{coat}$ which for constant current is proportional to the charge transferred during the deposition, does not eliminate this variation. The failure of this scaling may be related to how the quality of the coating depended on deposition rate as described below, or to the fact that coating adhesion rather than the actual deposition thickness was measured.

The dashed lines in FIG. 14 help to define favorable deposition conditions for preparing adequately adhesive, uniform, monolayer coatings. The dashed line with negative slope is an estimate of the deposition conditions required for coating a monolayer of capsules. The increase in layer thickness with increasing deposition rate may indicate that the amount of binder incorporated into the deposited coating increased with increasing deposition rate.

The right-hand dashed line with positive slope in FIG. 14 indicates the current density at which there was a transition from poor adhesion to adequate adhesion. Judging coating adhesion was highly qualitative; however, it was clear that coatings prepared at low current density were easily damaged in washing and handling on removal from the deposition slurry, while coatings prepared at higher current densities could be washed extensively without evident damage. Adhesion is also often poor at very low coating thicknesses (or low capsule coverages). The adhesion transition may be linked to an increase in binder content in the coating at higher current densities.

Figure 15:
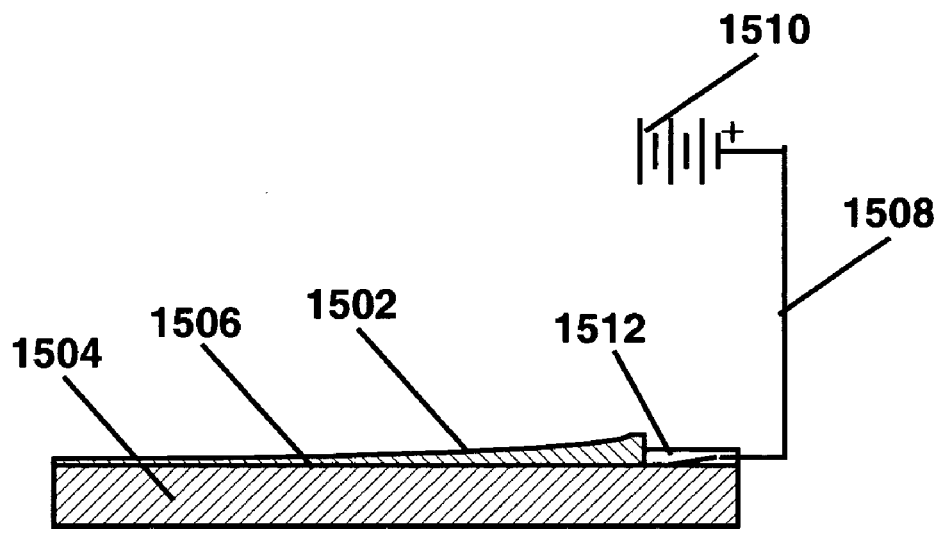
FIG. 15 is a schematic side elevation illustrating the variation of capsule coating thickness with distance from a current source.

The left-hand dashed line with positive slope in FIG. 14 indicates the approximate current density range at which there was a transition from relatively uniform coating deposition over the coated substrate to obviously non-uniform deposition. Uniformity for very thick films at constant current density was not investigated. Non-uniformity was assessed by observing the coating under transmitted light and typically it was evident as a decrease in coating thickness with increasing distance from the current source as illustrated schematically in FIG. 15. This Figure illustrates a phenomenon observed by which the thickness of a deposited capsule 1502 on a glass substrate 1504 provided with a conductive ITO layer 1506 is at its thickest near the point where an insulated wire 1508 extending from a current/voltage source 1510 is connected to the conductive layer 1506 beneath an insulating mask 1512.

These experiments were conducted with relatively small area substrates, $200<A_{coat}<400$ mm², and the counter-electrode was essentially a point source approximately centered 10 to 20 mm over the deposition substrate. Had the surface area of the substrate been much bigger relative to the gap between it and the counter-electrode, a different range of optimal deposition conditions might have been found. However, FIG. 14 shows that optimal deposition conditions can be defined empirically.

EXAMPLE 6

Effects of Excess Ion Concentration on Coating Uniformity

Following the experiments on small substrates described in Example 5 above, coating uniformity on larger surface area substrates, $A_{coat}$ about 2200 mm², was also studied. The substrates were coated using the horizontal apparatus of FIG. 5B with the same counter-electrode as in Example 5, namely essentially a point source centered approximately 10 to 20 mm above the substrate. FIG. 16 shows the effect of excess ion concentration on coating uniformity; the scale shown is in centimeters. Slurries used to prepare the coatings had the same microcapsule-to-binder content, $x_c/x_b=20$, although the slurry used to prepare the left-hand coating in FIG. 16 had a somewhat higher concentration of microcapsules, $x_c=0.43$ versus 0.37. The slurry used to prepare the left-hand coating in FIG. 16 contained no added excess ions other than those present after extensive distilled water washing of the capsules, those added upon pH adjustment, and those added with the binder; the conductivity of the supernatant liquor, after the capsules were centrifuged out but the binder remained, was approximately 490 µS/cm. The slurry used to prepare the right-hand coating in FIG. 16 contained $3\times10^{-2}$ M excess ammonium chloride, and this added salt increased the conductivity of the supernatant liquor to approximately 3.8 mS/cm. For both depositions, the current density was 1.0 A/m², however the deposition time for the left-hand coating was 408 seconds while the deposition time for the right-hand coating was only 200 seconds.

The left-hand coating shown in FIG. 16 is highly non-uniform, ranging from almost no capsule adhesion in the lower corners to a thick multilayer, approximately 2 to 3 capsule layers thick, in the center below the apparent position of the counter-electrode. When the point counter-electrode used to generate the coatings shown in FIG. 16 was replaced by a wire electrode coiled and pan-caked to cover the coated area, the non-uniformity in coating took on the form illustrated in FIG. 15.

Increasing the excess ion concentration caused significant improvements in coating uniformity. The right-hand side of FIG. 16 shows the uniform, approximately monolayer, coating extending across the entire exposed conductive face of the substrate obtained from the slurry containing added ammonium chloride. Slight variations in shading are still visible on the substrate, for example the circular region in the lower left-hand corner, and these slight variations indicate small differences in capsule packing density which are more visible in this transmission mode picture than the reflective mode in which the display is normally used. Other coatings produced with different counter-electrode geometries and electrode configurations showed this pattern, suggesting that was due to a defect or non-uniformity of the conductivity of the ITO substrate, not one inherent in the deposition process of the present invention.

Addition of the excess salt had another weaker but useful effect. Added salt appeared to improve coating uniformity by weakening adhesion of capsules deposited on top of the first layer of capsules, so that on removal of the coated substrate from the slurry, it was relatively easy to wash away any multi-layers of capsules in the coating to produce a monolayer coating such as that shown on the right-hand side of FIG. 16. In effect, this weakened capsule adhesion makes the deposition process insensitive to deposition time, i.e., decreases the slope of curves such as those shown in FIGS.

8 and 14. Under this conditions a monolayer coating can be achieved without exact control of the deposition time, thus making the process of the present invention more robust.

EXAMPLE 7

Figure 17A:
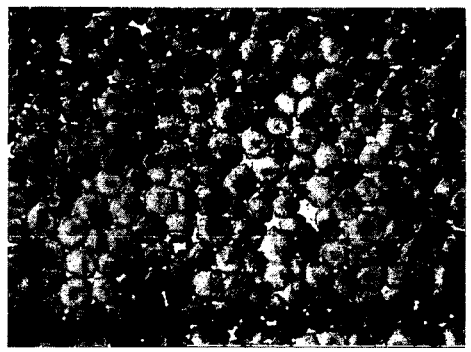
FIGS. 17A and 17B are micrographs of capsule layers produced by slot coating and by a process of the present invention.
Figure 17B:
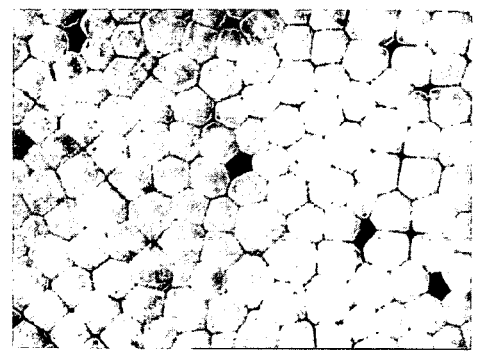

Electro-Optical Performance of Displays Prepared by Present Process Versus Displays Prepared by Metered Slot Coating It has been found that the electro-optical performance of displays prepared by the process of the present invention compares well to prior art displays prepared by metered slot coating. FIGS. 17A and 17B compare the appearance under transmitted light of monolayer capsule coatings prepared by slot coating on PET (FIG. 17A) and electrophoretic deposition in accordance with the present invention on glass (FIG. 17B). It will be seen from FIG. 17A that, as is typical of metered slot coatings, the capsule layer had few voids. On the other hand, FIG. 17A, taken with transmitted light, highlights the rounded nature of capsules and thus the relatively poor capsule-to-capsule and capsule-to-ITO packing. The higher salt content used in the electrodeposition slurry to improve lateral coating uniformity over large length scales also improved capsule-to-capsule and capsule-to-ITO wetting as shown in FIG. 17B.

Figure 18:
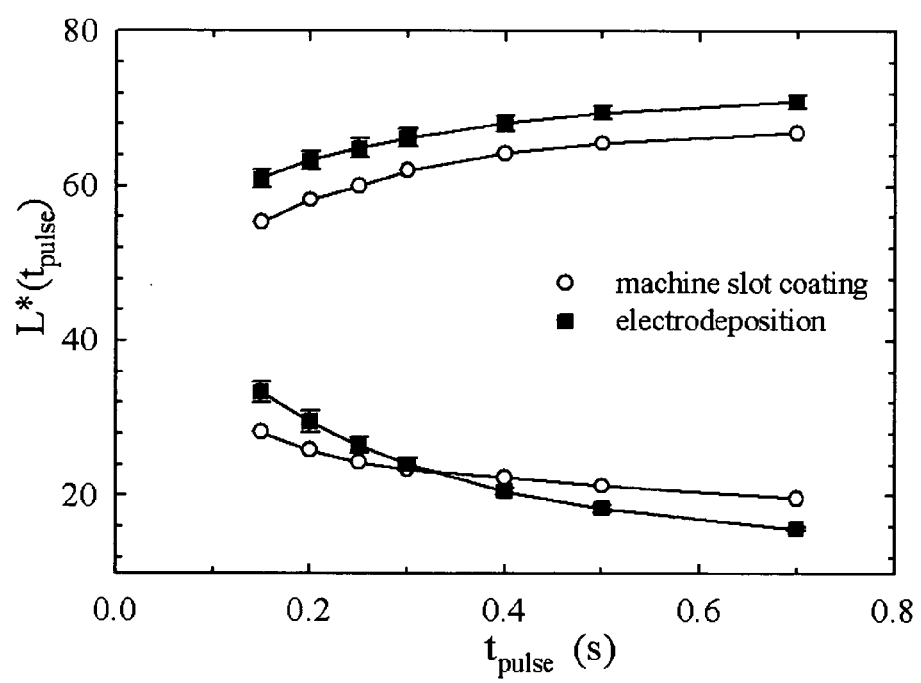
FIG. 18 is a graph showing the variation of reflectivity of the white and dark states of the capsule layers shown in FIGS. 17A and 17B with drive pulse lengths during the experiments described in Example 7 below.

The electro-optical performance at 25° C. of the displays shown in FIGS. 17A and 17B was characterized in substantially the same way as in Example 4 above but over a range of drive pulse lengths ($t_{pulse}$). FIG. 18 shows display lightness (L*) measured under the standard lighting conditions as a function of $t_{pulse}$. The encapsulated electrophoretically active internal phase was nominally the same for both displays, although the capsule size distribution used in preparing the electrodeposited coating of the present invention was broader and shifted to a slightly larger mean capsule size.

FIG. 18 shows that the coating of the present invention performed well compared to the slot coated sample. At short $t_{pulse}$, the dynamic range of both displays was comparable; however, at longer $t_{pulse}$ the coating of the present invention significantly outperformed the slot coated sample, initially in white state, but ultimately in both white and dark states achieved. Other aspects of display performance, for example short and long term image stability, were similar for these displays. It should be noted that the improvement in capsule packing using the process of the present invention visible in FIGS. 17A and 17B may not be solely attributable to the use of the invention.

EXAMPLE 8

Formation of Self Supporting Capsule Binder Coatings

In Example 3 above, the positive effect of a $KH_2PO_4$ pH 8 buffer solution on reducing electrochemical degradation of thin ITO coatings was described. To further investigate this effect, a capsule slurry was adjusted to pH 8 using this buffer solution, and the same NeoRez 9314/NeoRez 9621 binder was added to the capsules to produce a final slurry with $x_c=0.35$, and $x_c/x_b=20$. Coatings of this slurry on to glass/ITO substrates were prepared by the process of the present invention and unusual behavior of these coatings was observed. The capsule/binder coatings separated easily as a sheet from the glass/ITO substrate, but the coatings maintained their lateral coating integrity. This behavior was first noticed with multilayer capsule coatings because these coatings were strong enough to support their own weight when held vertically; it was possible to carefully lift the coating from the glass/ITO substrate. Monolayer capsule layers were much weaker and therefore more difficult to handle; however, they also formed films with substantial integrity.

After drying, unlike the coatings of the present invention discussed in previous Examples, the coatings prepared in the presence of the buffer shrank or compressed laterally such that the surface area of the dried coating was less than $A_{coat}$. This lateral contraction produce highly packed capsule layers where surface coverage was virtually 100%. FIGS. 19A-19D show representative micrographs of a) a bilayer coating at approximately 10× magnification (FIG. 19A); b) the same coating at approximately 5× magnification (FIG. 19B); c) an approximately monolayer coating at approximately 10× magnification (FIG. 19C); and d) the same coating at approximately 5× magnification (FIG. 19D). All micrographs were taken with the exposed surface of the coating switched to the white state. FIGS. 19A-19D show the excellent capsule packing that was achieved. It is likely that strength/integrity of monolayer coatings could be improved by increasing the binder concentration. This Example also suggests that by selectively limiting electrochemical chemical interactions between the binder/capsules and the surface being coated, adhesion of the coating to the surface can be adjusted to allow preparation of self-supporting coatings that can be transferred to other substrates.

EXAMPLE 9

Preparation of Patterned Coatings

As discussed above, the process of the present invention has the advantage that capsules and binder are deposited only on to conductive surfaces held at a potential difference from the counter-electrode and in contact with the coating slurry, so that the present process can be used to prepare patterned coatings of capsules. Also as already discussed, this may be useful for patterning capsules containing different electrophoretic particles, for example in preparing multicolor displays where a pixel is composed of sub-pixels that switch between different pairs of colors.

Figure 20A:
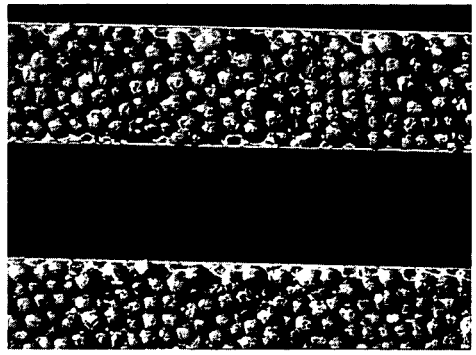
FIGS. 20A-20C are micrographs of capsule layers produced during the experiments described in Example 8 below.
Figure 20B:
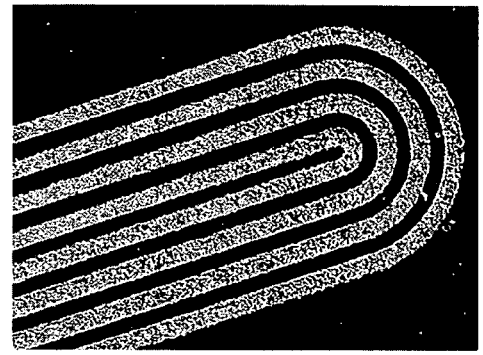
Figure 20C:
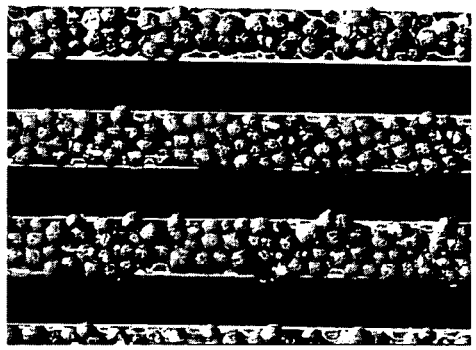
Figure 21:
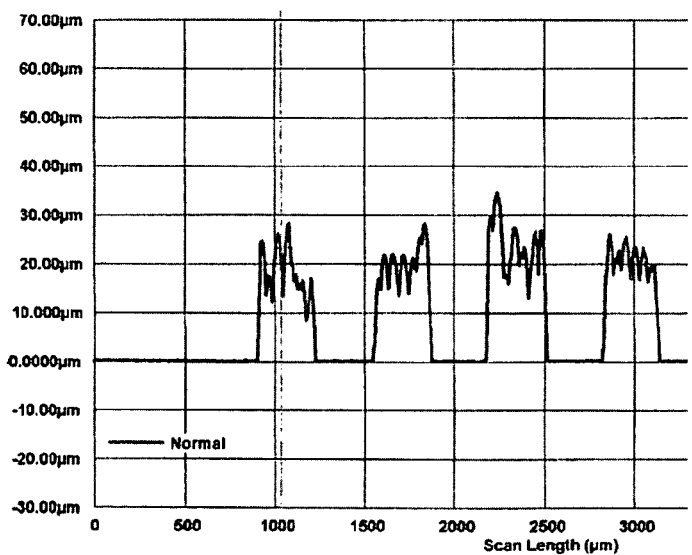
FIG. 21 is a coating thickness profile of the coating shown in FIG. 20A in a direction extending perpendicular to the bands of capsules.

The ability of the present process to produce high resolution capsule patterns was demonstrated by electrodepositing capsule/binder coatings on to the alternating electrodes of a resolution target, which consisted of a series of seven parallel conductive chrome stripes separated by 7.5 µm of non-conductive glass. In one experiment, coatings were deposited on to alternating stripes where the width of the stripes was 312 µm, equivalent to 80 lines per inch resolution. In a second experiment, the width of the stripes was 139 µm, equivalent to 175 lines per inch resolution. FIGS. 20A-20C show micrographs of these coatings at 80 and 175 line per inch resolution (FIGS. 20A and 20C respectively; FIG. 20B is a lower magnification micrograph showing the 80 lines per inch pattern), while FIG. 21 shows a coating thickness profile at 80 lines per inch resolution. Both figures demonstrate selective coating of only the active electrodes. Thus, these experiments confirm that patterned capsule displays can be prepared by sequential deposition of different lots of capsules, e.g., to produce different colored strips. The only limit to the resolution of patterns that can be prepared by the present process appears to be the size of the capsules being deposited.

EXAMPLE 10

Use of Process of the Invention to Coat Non-Planar Substrates

Figure 22:
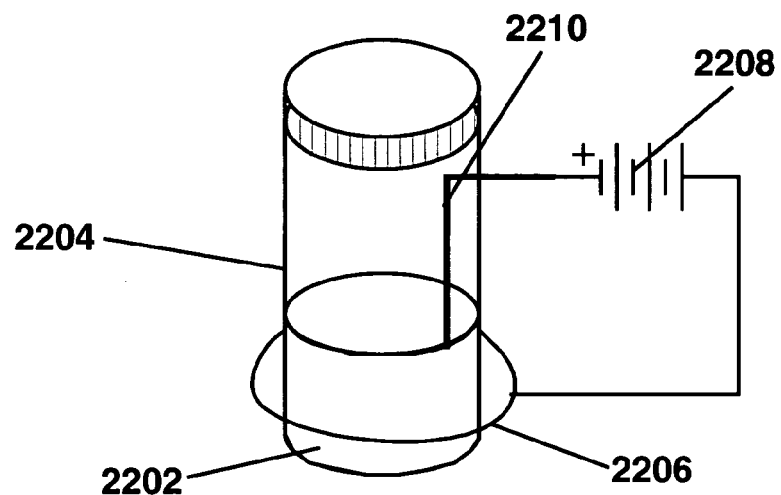
FIG. 22 is a schematic three quarter view, from above and to one side, of an apparatus which may be used to carry out capsule deposition by a process of the present invention on to a cylindrical substrate.

As already discussed above, another advantage of the process of the present invention is the ability to prepare uniform thickness coatings on non-planar substrates. To demonstrate the feasibility of this type of coating, capsule/binder coatings were deposited onto cylindrical surfaces using the apparatus shown in FIG. 22. A cylindrical deposition electrode 2202 was prepared by wrapping a 2.6 cm diameter glass vial 2204 with copper tape. A platinum wire counter-electrode 2206 encircled, and was spaced approximately 10 mm from, the deposition electrode 2202, the two electrodes being connected via a current/voltage source 2208 and an insulated wire 2210. Capsules were then coated onto the copper surface of the electrode 2202 by submerging the vial 2204 in a capsule/binder slurry.

Figure 23A:
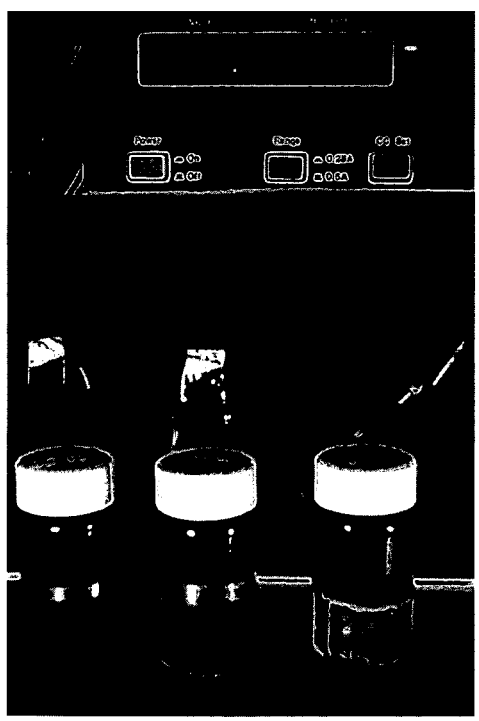
FIGS. 23A and 23B show coated cylindrical substrates coated by the apparatus of FIG. 22 in a process of the present invention.
Figure 23B:

After this coating, the coated layer was dried and made into a display by laminating a PET/ITO sheet coated with adhesive on to the cylindrical surface. FIGS. 23A and 23B illustrate a working cylindrical display thus prepared. In each of FIGS. 23A and 23B, the left and center vials are left in the dark state, while the right hand vial is switched from white to dark. It was difficult to achieve uniform lamination since the proper equipment to heat and press the PET/ITO sheet on to the cylindrical deposition electrode was not available, and non-switching regions, visible near the lower edge of the displays shown in FIGS. 23A and 23B, are indicative of poor lamination.

EXAMPLE 11

Process of the Invention for Preparing Thin Adhesive Coatings

Like the binder described in Example 4 above, typical lamination adhesives used for laminating an encapsulated electrophoretic medium deposited on an electrode to a backplane (see the aforementioned E Ink and MIT patents and applications, especially 2003/0025855) consist of charge stabilized (negative at pH 8) polyurethane latex dispersions. One challenge in preparing optimally performing electrophoretic displays is to prepare thin, uniform thickness coatings of the adhesive materials. At present, it is desirable to be able to prepare adhesive coatings with dry thicknesses less than 20 μm, and it has been found that such thin adhesive coatings can be prepared by a preferred embodiment of the present invention.

Figure 24:
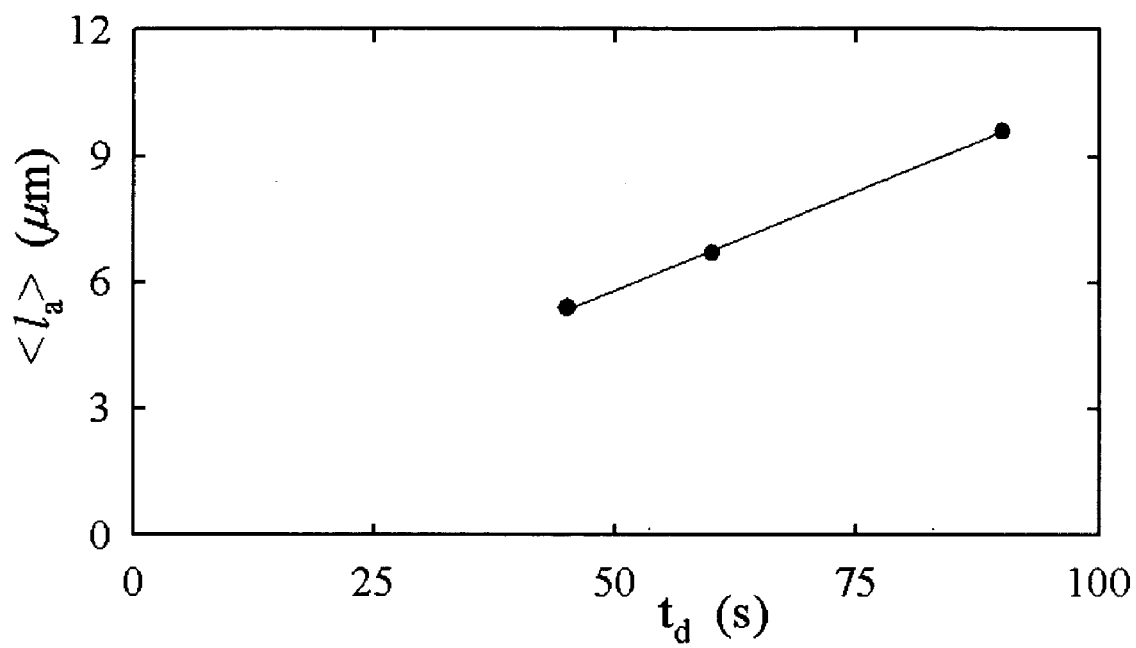
FIG. 24 is a graph showing the variation in average dried lamination adhesive thickness with deposition time for adhesive layers produced in the experiments described in Example 11 below.

Electrophoretic deposition was used to prepare thin coatings of the aforementioned NeoRez 9314/NeoRez 9621 binder/lamination adhesive (see the aforementioned 2003/0025855 for details of the supplier and the chemistry of these materials) on glass/ITO surfaces. The vertical apparatus of FIG. 5A was used with a fixed gap (10 mm) between electrodes and at a constant deposition voltage of 4 V. As with capsule/binder coatings, deposition time was used to control coating thickness, and the coating thickness was measured by profilometry. FIG. 24 shows the average thickness ($<1_a>$) of dried lamination adhesive layers as a function of deposition time ($t_d$). Adhesive layers prepared in this manner were very smooth with root mean square roughnesses of less than 0.1 μm and the layers also had little to no apparent long length scale waviness or variation in thickness. As with capsule/binder coatings, adhesive coating thickness grew linearly with increasing deposition time. Displays could be constructed by laminating an adhesive coated back-plane electrode directly onto a capsule/binder coating on a top-plane electrode.

EXAMPLE 12

Deposition of Lamination Adhesive Coatings Directly on to Coated Capsule/Binder Layers In practice, prior art methods for the production of electrophoretic displays with thin (less than 20 μm) layers of lamination adhesive require coating the adhesive on to a release sheet, transferring or laminating the dried adhesive layer on to a capsule/binder layer previously formed on a substrate bearing an electrode (for example, PET/ITO or glass/ITO), removing the release sheet and then laminating the capsule/adhesive stack to the backplane of the display. This process is used because coating a thin adhesive layer directly onto the capsule/binder layer presents great practical difficulties.

Using the process of the present invention, it was possible to coat thin layers of adhesive directly onto the capsule/binder layer and thus eliminate one lamination step. This more efficient display assembly process was accomplished by sequential electrophoretic deposition, first of a capsule/binder layer and then of an adhesive layer directly onto the capsule/binder layer. Working displays were then assembled by laminating a PET/ITO substrate directly to the adhesive layer covering the capsule/binder layer.

Figure 25:
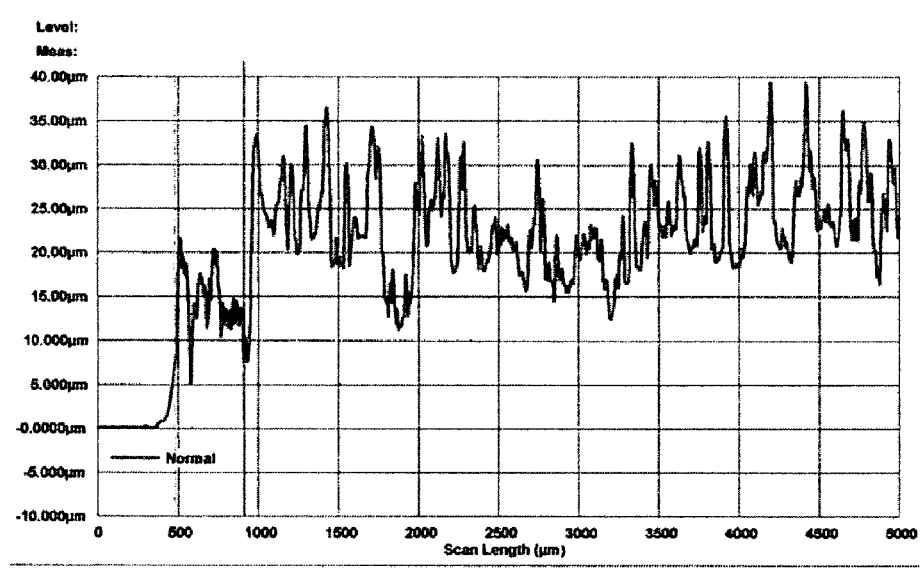
FIG. 25 is a coating thickness profile of a substrate bearing a capsule/binder layer produced by a process of the present invention, part of this capsule/binder layer being covered by a lamination adhesive layer, as described in Example 12 below.

The presence of adhesive layer deposited on to the capsule/binder layer and an estimate of its thickness was made using profilometry measurements. The vertical apparatus of FIG. 5A was used; for both capsule/binder and adhesive deposition; the electrode gap was 10 mm and the deposition voltage was 4 V. Capsule/binder layers were deposited onto glass/ITO, and several coatings at each set of deposition conditions were prepared. Some coatings were reserved for determination of the capsule/binder layer thickness, and other were coated with adhesive by submerging the electrodes into the adhesive polyurethane dispersion. By using the vertical apparatus, it was possible to coat adhesive over only part of the capsule/binder coating as illustrated in FIG. 25, which shows the profile of a capsule/binder layer with an adhesive layer deposited on top. From left to right, this Figure shows the glass/ITO surface for about 500 μm, then a step up to the capsule/binder layer (average thickness of 15 μm) which extends for about 500 μm, and then a step up for the adhesive layer, where the whole coating has an average thickness of about 23 μm. FIG. 25 shows that the adhesive coating has no apparent effect on changing the roughness of the capsule/binder layer, consistent with the fact that adhesive latices are at least two orders of magnitude smaller in size than capsules.

Table 2 below shows results for coating of various thicknesses of adhesive ($<1_a>$) on to two different average thickness ($<1>$) capsule/binder layers. A range of different adhesive thickness coatings was prepared, from about 5 to 20 μm; the increase in adhesive coating thickness with deposition time ($t_d$) was approximately linear. The rate of deposition was slightly greater than that in FIG. 24 and there was an apparent induction time before significant layer growth occurred. Deposition of the adhesive had little to no effect on the root mean square roughness of the coating. Thinner coatings could be prepared; however, the roughness of the capsule/binder layer which is a result of the broad size distribution of the capsules used in these experiments prevented adequate characterization of the adhesive layer. Each multilayer capsule/binder/adhesive stack in Table 2 was assembled into a working display by laminating a PET/ITO substrate directly to the adhesive coating.

In Table 2, adhesive thickness is the root mean square thickness <$1_a$> determined from profilometry measurements of the thickness of the multilayer stack and by subtracting from that measure the thickness of a typical capsule/binder layer prepared under identical deposition conditions.

TABLE 2

| capsule/binder layer <1> (μm) | capsule/binder layer roughness (μm) | adhesive layer $t_d$ (sec) | adhesive layer <$1_a$> (μm) | adhesive layer roughness (μm) |
|---|---|---|---|---|
| 18.3 | 5.2 | 105 | 5.2 | 5.1 |
| 23.6 | 5.7 | 150 | 8.9 | 4.9 |
| 23.6 | 5.7 | 210 | 18.9 | 4.2 |

Table 2 shows that the process of the present invention can be used to create uniform thickness multilayer coatings with independent control of coating thickness for each layer in the multilayer stack. In the case of adhesive or other charged dispersions where the average size of the deposited component is small, say of the order of 0.1 μm, coatings thickness can range from sub-micron to greater than 10 μm. There is no technical reason to assume that the present process is limited to the two layer stacks used in these experiments; for example it may be advantageous to deposit an ultra-thin layer of an adhesive or wetting agent prior to capsule deposition to improve capsule wetting or adhesion to the adjacent electrode and then proceed with successive depositions of capsules, binder and adhesive.

Figure 26:
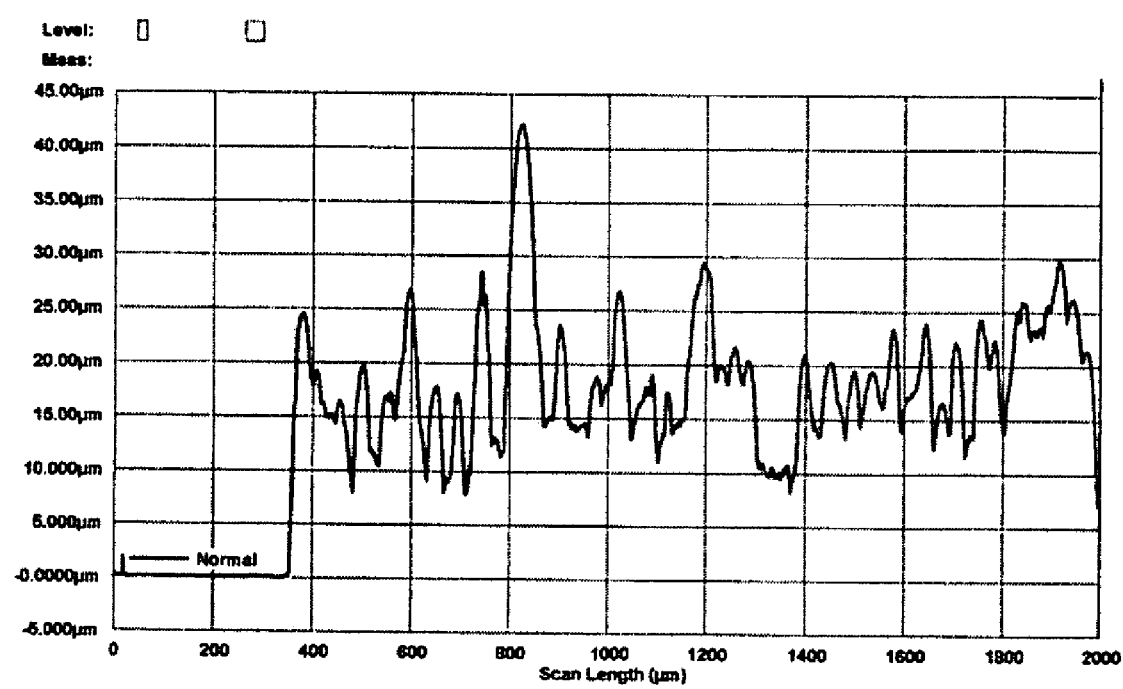
FIG. 26 is a coating thickness profile of a substrate bearing a capsule layer produced by a process of the present invention, as described in Example 13 below.

FIG. 26 shows the thickness profile of a typical monolayer of capsules deposited by the process of the present invention. The root mean square roughness was 5.9 μm, which is typical. Somewhat increased roughness may be expected for severely depleted (sub-monolayer) and multilayer coatings. Roughness in monolayer coatings appears to be caused largely by broad capsule size distribution. Although one might expect roughness to be influenced by the amount of binder in the coating, all the layers produced in Example 4 above showed a root mean square roughness of approximately 6 μm. Roughness may be reduced by narrowing the capsule size distribution, but is likely to remain of the order of 1 μm because of the curvature of the exposed surfaces of the capsules, which are not flattened by contact with an electrode. It is likely that metered slot coated capsule/binder monolayers have similar roughness, although this has not been confirmed experimentally.

It is desirable to reduce this roughness substantially because lamination of adhesive to the exposed surface of the capsule coating can trap air bubbles in the valleys thereof. These trapped air bubbles are called lamination voids and their presence negatively impacts many aspects of display performance. Therefore, it is desirable to minimize voids and this can be done by reducing the roughness of the capsule layer.

It was shown in Example 12 above that, at least in some cases, deposition of adhesive on to a capsule monolayer by the process of the present invention did not affect the roughness of the monolayer, suggesting that adhesive was uniformly deposited on to the capsule layer. This appears reasonable given the small size of the latices composing the urethane adhesive used in Example 12, less than 0.1 μm, relative to that of the capsules, 20 to 60 μm (the large particles are essentially flat to the small particles). Lamination of the composite capsule/adhesive layer to a back-plane electrode is likely to be troublesome with respect to voids, i.e., the problem has been transferred from between the capsule and adhesive layers to between the adhesive layer and the back plane.

It is, however, suggested that sequential electrodeposition, in accordance with the present invention, of a relatively thin adhesive (or binder) layer of larger latex particles (say about 1 to 5 μm average size) can be used to reduce the roughness of the final composite layer. In contrast to the situation with the very small sized adhesive latices used in Example 12, the capsule coating will not appear flat to the larger adhesive latices and the adhesive particles will thus fill valleys in the capsule coating. For this case, roughness is expected to decrease as the adhesive coating is grown by extending the deposition process. It maybe even more advantageous to use a very polydisperse latex adhesive to achieve even greater reductions in the roughness of the coating.

As already mentioned, FIGS. 5A and 5B show vertical and horizontal electrodeposition apparatus which can be used in the present process. The capsules used in the experiments described above are more dense than water, specific gravity approximately 1.06. Because of their size, these capsules settle appreciably during the time scale required to electrodeposit a monolayer of capsules, and thus gravitational settling can impact formation of the deposited layer when using the vertical apparatus of FIG. 5A. Settling effects can be minimized by mixing the dispersion; however, effective mixing was difficult to implement on the small size scale of the experiments previously described. Accordingly, most experiments used the horizontal apparatus of FIG. 5B.

When using the horizontal apparatus, capsules were allowed to settle onto the deposition electrode prior to and during the deposition process. Sedimentation, or more specifically the compression of capsules onto the deposition electrode, was found to improve capsule packing on the electrode. This was observed for binder-less deposition, as described in Example 1, where the surface coverage of capsules was found to increase, and also in the presence of binders, as in Example 5, where packing on to the electrode face was improved.

These observations are consistent with the idea that electrodeposition and filling of a monolayer is a disordered packing process. Capsules electrophorese to the electrode, impact the layer, and deposit, and so as the layer progresses to complete monolayer coverage, voids present in the monolayer may not be filled before the next layer starts building up. This "defect trapping" is probably exacerbated if capsule deposition is a sticky process, that is if capsules deposit and are adhered to the layer close to where they first hit the electrode substrate. When capsules are allowed to sediment onto the electrode prior to deposition, the pressure of the sedimented pack above the layer in contact with the electrode should act to improve packing of capsules in the layer in contact with the electrode and this should improve appearance of the deposited layer once electrodeposition proceeds. Pressure in the sediment pack, which will act to force capsules to fill capsule voids, is proportional to the height of the sediment pack and slurry supernatant above the horizontal deposition electrode; therefore this pressure can be increased by extending the height of the reservoir of capsule slurry above the deposition electrode (note that in the apparatus of FIG. 5B the position of the counter-electrode can be set independently of the height of the slurry reservoir).

An obvious drawback of the horizontal apparatus of FIG. 5B is that any large foreign objects that contaminate the dispersion, for example dried capsule agglomerates caused by extended and repeated exposure of the slurry to air and handling, settle most rapidly and contaminate the coating with defects. This problem has been found to be easily controlled in practice by proper handling of the slurry.

The capsule/binder coatings produced in the Examples above were all made in a piece-wise (batch) manner. It is often desirable for economic reasons to produce capsule/binder and adhesive coatings in a continuous coating process where a long, fixed width web of (say) PET/ITO is coated and processed in a roll-to-roll manner. The coated web can then be cut into pieces for final assembly into displays as needed. The process of the present invention can be used in this type of roll-to-roll process.

A roll-to-roll process of the present invention has many steps in common with metered slot coating prior art processes as described in the aforementioned E Ink and MIT patents and applications, the key difference being replacement of the slot coating die with an electrodeposition bath and wash step. The PET/ITO (or similar electrode-carrying web) used as the deposition electrode would always remain connected to the current source and some portion of the web would be masked or pre-coated with a resist to prevent capsule deposition. Residence time in the coating bath in the vicinity of a counter electrode determines the deposition time (which, as noted above, is a function of the bath geometry and translation velocity of the substrate). On exiting the deposition bath, the web would be washed (e.g., by passing it through another bath) to remove non-adhered capsules and (optionally) binder; wash effluent could be retained and capsules recycled to the deposition bath. The deposition bath composition could be monitored in the manner of a continuous stirred tank reactor so that its composition is kept constant throughout the deposition process as material is used up and excess capsules are recycled to the bath. Multi-layering of various component coatings, for example deposition of adhesive onto the capsule/binder layer, could be accomplished by running the web through a sequence of deposition baths.

The advantages of the process of the present invention include its ability to produce uniform thickness coatings ranging from sub-monolayer to multilayer coatings. These coatings may be deposited directly on to a top plane electrode which forms the viewing surface of the display (the surface through which an observer views the display) and the resultant assembly then laminated to a back-plane, or the coating may be deposited on to the back-plane electrodes and the resultant back plane laminated to the front electrode; the former is typically more desirable as regards electro-optical properties, but the latter may be more convenient for certain applications or processes. The process of the present invention can be engineered to produce high fractional coverage monolayer coatings of capsules, and to be insensitive to counter-electrode position, so that non-planar substrates can be coated under conditions where the counter-electrode does not conform exactly to the substrate shape. The present process allows coating under formulation conditions (for example, at lower binder-to-capsule ratios or without rheological control additives) that may improve capsule wetting onto the front electrode and therefore the electro-optical properties of electrophoretic displays.

The present process can be used to produce thin, multiple (two or more) layers of different components on to the same substrate (for example, a layer of capsules followed by a layer of lamination adhesive) without intervening drying steps, and can also be used to produce free-standing capsule films. The present process can be used to produce coatings in which the wet deposited layers of capsules are immediately adherent to the coating substrate such that the coated substrate can undergo other coating processes or post coating processes prior to drying. The present process can be used in both batch and continuous coating versions (for example, roll-to-roll), and does not require micro-patterning of the coating substrate to produce highly uniform coverages of the coated substrate (cf. U.S. Pat. No. 6,487,002). The present process can be used to produce laterally patterned coatings of two or more different encapsulated electrophoretic dispersions at low or high resolutions, for example, to produce a pattern of red-white, blue-white and green-white pixels for making a color display.

The present process does not require modification of prior art encapsulation technology (for example, gelatin-acacia encapsulation) used in the production of electrophoretic displays, since the encapsulation medium can be charged in aqueous media simply by adjusting the pH. The present process will also work with other encapsulation technologies/chemistries, for example gelatin-polyacrylic acid, gelatin-hexametaphosphate, etc., that also cause electronic ink microcapsules to be charged.

Although the process of the present invention has been described above in its application to encapsulated electrophoretic displays, the present process may be useful with other types of electro-optic displays.

Numerous changes and modifications can be made in the preferred embodiments of the present invention already described without departing from the spirit and skill of the invention. Accordingly, the foregoing description is to be construed in an illustrative and not in a limitative sense.

The invention claimed is:

1. A process for forming a coating of an encapsulated electrophoretic medium on a conductive portion of a substrate, the process comprising:
    dispersing in a fluid a plurality of capsules each comprising a capsule wall, a suspending fluid encapsulated within the capsule wall and a plurality of electrically charged particles suspended in the suspending fluid and capable of moving therethrough on application of an electric field to the capsule;
    contacting the conductive portion of the substrate with the fluid; and
    applying a potential difference between the conductive portion of the substrate and a counter-electrode in electrical contact with the fluid, thereby causing capsules to be deposited upon the conductive the portion of the substrate.

2. A process according to claim 1 wherein the conductive portion of the substrate comprises at least one electrode, and the potential difference is applied to the at least one electrode, thereby causing capsules to be deposited upon the at least one electrode.

3. A process according to claim 2 wherein the substrate bears at least first and second electrodes and the potential difference is applied to the first electrode, thereby causing capsules to be deposited upon the first electrode but not on the second electrode, the process further comprising:
    removing the substrate from the fluid;
    dispersing in a second fluid a plurality of second capsules each comprising a capsule wall, a suspending fluid encapsulated within the capsule wall and a plurality of electrically charged particles suspended in the suspending fluid and capable of moving therethrough on application of an electric field to the capsule, the second capsules being capable of displaying at least one optical characteristic differing from the optical characteristics displayed by the capsules deposited on the first electrode;

contacting the second electrode with the second fluid; and applying a potential difference between the second electrode and a counter-electrode in electrical contact with the second fluid, thereby causing the second capsules to be deposited upon the second electrode but not upon the first electrode.

4. A process according to claim 3 wherein the substrate bears at least first, second and third electrodes, the process further comprising:

removing the substrate from the second fluid;

dispersing in a third fluid a plurality of third capsules each comprising a capsule wall, a suspending fluid encapsulated within the capsule wall and a plurality of electrically charged particles suspended in the suspending fluid and capable of moving therethrough on application of an electric field to the capsule, the third capsules being capable of displaying at least one optical characteristic differing from the optical characteristics displayed by the capsules deposited on the first and second electrodes;

contacting the third electrode with the third fluid; and applying a potential difference between the third electrode and a counter-electrode in electrical contact with the third fluid, thereby causing the third capsules to be deposited upon the third electrode but not upon the first and second electrodes.

5. A process according to claim 4 wherein the first, second and third capsules are each capable of displaying one of red, green and blue optical characteristics.

6. A process according to claim 4 wherein the first, second and third capsules are each capable of displaying one of yellow, cyan and magenta optical characteristics.

7. A process according to claim 1 further comprising depositing a polymeric binder on the substrate.

8. A process according to claim 7 wherein the polymeric binder is deposited at the same time as the capsules.

9. A process according to claim 8 wherein the fluid comprises a polymeric latex which is deposited at the same time as the capsules to form a polymeric binder surrounding the capsules.

10. A process according to claim 9 wherein the polymeric latex comprises a polyurethane latex.

11. A process according to claim 1 further comprising depositing a lamination adhesive on the substrate.

12. A process according to claim 11 wherein the lamination adhesive is deposited on the substrate after deposition of the capsules thereon.

13. A process according to claim 11 wherein a conductive portion of the substrate is contacted with a fluid containing the lamination adhesive and a potential difference is applied between the conductive portion of the substrate and a counter-electrode in electrical contact with the fluid containing the lamination adhesive, thereby causing the lamination adhesive to be deposited upon the conductive portion of the substrate.

14. A process according to claim 1 wherein the fluid is an aqueous fluid.

15. A process according to claim 1 wherein the fluid contains a buffer.

16. A process according to claim 1 wherein the fluid/capsule mixture has a conductivity of at least about 10 $\mu$S/cm.

17. A process according to claim 1 wherein more than one layer of capsules are deposited on the conductive portion of the substrate, and after removal of the substrate from the fluid, the substrate is washed to remove some of the deposited capsules, thereby leaving substantially a monolayer of capsules on the conductive portion of the substrate.

18. A process according to claim 1 wherein the conductive portion of the substrate on which the capsules are deposited is non-planar.

19. A process according to claim 18 wherein the portion of the substrate on which the capsules are deposited is curved in both dimensions.

20. A process according to claim 1 wherein the contacting of the fluid with the conductive portion of the substrate is effected by immersing at least the conductive portion of the substrate in the fluid.

21. A process according to claim 1 wherein the contacting of the fluid with the conductive portion of the substrate is effected by coating at least the conductive portion of the substrate with the fluid.

22. A process according to claim 21 wherein at least the conductive portion of the substrate is slot coated with the fluid.

23. A process according to claim 22 wherein the substrate comprises a conductive layer and the potential difference is applied between the conductive layer of the substrate and an electrode provided on the slot coating head.

24. A process according to claim 21 wherein the fluid further comprises a polymeric binder.

25. A process according to claim 24 wherein at least part of the binder is uncharged in the fluid.

26. A process according to claim 25 wherein the binder comprises a mixture of charged and uncharged particles in the fluid.

27. A process according to claim 24 wherein the polymeric binder comprises a soluble polymer.

28. A process according to claim 1 wherein the substrate is provided with a conductive layer the conductivity of which varies with radiation exposure, a first portion of the conductive layer is exposed to radiation but a second portion is not, and a potential is applied to the conductive layer while the substrate is in contact with the fluid, thereby causing capsules to be deposited upon one of the first and second portions of the conductive layer but not upon the other.

29. A process according to claim 1 wherein the substrate is provided with a conductive layer, a first portion of which is covered with an insulating layer but a second portion is not, and a potential is applied to the conductive layer while the substrate is in contact with the fluid, thereby causing capsules to be deposited upon the second portion of the conductive layer but not upon the first.

30. A process according to claim 29 wherein the insulating layer is provided by covering the conductive layer with a photoresist, imagewise exposing the photoresist to radiation, and removing the photoresist from the second portion of the conductive layer.

* * * * *